United States Patent
Moyal et al.

(10) Patent No.: US 10,754,506 B1
(45) Date of Patent: Aug. 25, 2020

(54) MONITORING AND CONTROLLING RISK COMPLIANCE IN NETWORK ENVIRONMENTS

(71) Applicant: CyberArk Software Ltd., Petach-Tikva (IL)

(72) Inventors: Noa Moyal, Hod Hasharon (IL); Rotem Elias, Kidron (IL); Guy Ben Arie, Holon (IL); Tal Kandel, Pardes Hana-Karkur (IL); Gil Makmel, Rishon LeZion (IL)

(73) Assignee: CyberArk Software Ltd., Petach-Tikva (IL)

( * ) Notice: Subject to any disclaimer, the term of this patent is extended or adjusted under 35 U.S.C. 154(b) by 0 days.

(21) Appl. No.: 16/594,434

(22) Filed: Oct. 7, 2019

(51) Int. Cl.
G06F 3/0482 (2013.01)
G06F 3/0484 (2013.01)
H04L 12/24 (2006.01)

(52) U.S. Cl.
CPC ........ *G06F 3/0482* (2013.01); *G06F 3/04842* (2013.01); *G06F 3/04847* (2013.01); *H04L 41/22* (2013.01)

(58) Field of Classification Search
CPC .. G06F 3/0482; G06F 3/0484; G06F 3/04847; H04L 41/22
See application file for complete search history.

(56) References Cited

U.S. PATENT DOCUMENTS

| | | | |
|---|---|---|---|
| 6,920,455 B1 | 7/2005 | Weschler | |
| 7,185,192 B1 | 2/2007 | Kahn | |
| 7,546,334 B2 * | 6/2009 | Redlich | G06F 21/554 709/201 |
| 8,135,815 B2 * | 3/2012 | Mayer | H04L 41/0893 709/221 |
| 8,279,874 B1 * | 10/2012 | Lu | H04L 41/0806 370/395.2 |
| 9,098,675 B1 | 8/2015 | Roth | |
| 9,137,110 B1 * | 9/2015 | Adogla | H04L 41/082 |
| 9,210,185 B1 * | 12/2015 | Pinney Wood | G06F 21/552 |
| 9,264,449 B1 | 2/2016 | Roth | |
| 9,537,880 B1 * | 1/2017 | Jones | H04L 63/1433 |
| 9,800,606 B1 * | 10/2017 | Yumer | H04L 63/1433 |
| 9,843,598 B2 * | 12/2017 | Chauhan | H04L 63/1425 |
| 10,148,701 B1 | 12/2018 | Hecht | |

(Continued)

*Primary Examiner* — Blake J Rubin
(74) *Attorney, Agent, or Firm* — Finnegan, Henderson, Farabow, Garrett & Dunner LLP

(57) ABSTRACT

Techniques include analyzing risk data for a plurality of network-based identities and generating interactive graphical user interfaces to allow for visualization of the risk data. Operations may include identifying a plurality of network-based identities that have been deployed in a network environment; identifying a scope of permissions associated with the plurality of network-based identities; determining a scope of activity of at least one of: use of the permissions, non-use of the permissions, or activity associated with the permissions for the plurality of network-based identities; developing risk statuses for the plurality of network-based identities; and generating a graphical user interface representing the risk statuses, the graphical user interface comprising a first graphical element having a size and a color, the size and the color being determined based on the risk statuses associated with a first platform within the network environment.

20 Claims, 15 Drawing Sheets

(56) References Cited

U.S. PATENT DOCUMENTS

| | | | |
|---|---|---|---|
| 10,257,227 B1* | 4/2019 | Stickle | G06F 21/554 |
| 10,395,029 B1* | 8/2019 | Steinberg | G06F 21/554 |
| 10,467,419 B1* | 11/2019 | Youngberg | G06F 21/563 |
| 2004/0044912 A1* | 3/2004 | Connary | H04L 43/045 |
| | | | 726/23 |
| 2007/0106986 A1* | 5/2007 | Worley, Jr. | G06F 9/45537 |
| | | | 718/1 |
| 2007/0143827 A1 | 6/2007 | Nicodemus | |
| 2009/0019316 A1* | 1/2009 | Buccella | G06F 11/008 |
| | | | 714/47.1 |
| 2009/0106133 A1* | 4/2009 | Redmayne | G06Q 30/0283 |
| | | | 705/35 |
| 2009/0178139 A1* | 7/2009 | Stute | G06Q 10/109 |
| | | | 726/22 |
| 2011/0231936 A1* | 9/2011 | Williams | G06F 21/577 |
| | | | 726/25 |
| 2011/0277034 A1* | 11/2011 | Hanson | G06F 21/554 |
| | | | 726/25 |
| 2012/0224057 A1* | 9/2012 | Gill | H04L 63/102 |
| | | | 348/143 |
| 2013/0298230 A1* | 11/2013 | Kumar | H04L 63/1425 |
| | | | 726/22 |
| 2014/0115706 A1* | 4/2014 | Silva | H04L 63/1425 |
| | | | 726/23 |
| 2014/0282825 A1 | 9/2014 | Bitran | |
| 2014/0359695 A1 | 12/2014 | Chari | |
| 2014/0359777 A1* | 12/2014 | Lam | G06F 21/577 |
| | | | 726/25 |
| 2015/0013008 A1* | 1/2015 | Lukacs | G06F 21/53 |
| | | | 726/24 |
| 2015/0101049 A1* | 4/2015 | Lukacs | G06F 21/554 |
| | | | 726/23 |
| 2015/0222656 A1* | 8/2015 | Haugsnes | H04L 63/1441 |
| | | | 726/23 |
| 2015/0324919 A1* | 11/2015 | Riggs | G06F 16/285 |
| | | | 705/36 R |
| 2015/0347759 A1* | 12/2015 | Cabrera | G06F 21/577 |
| | | | 726/25 |
| 2016/0050224 A1* | 2/2016 | Ricafort | H04L 63/1441 |
| | | | 726/23 |
| 2016/0212172 A1* | 7/2016 | Senanayake | G06F 3/0482 |
| 2016/0373478 A1* | 12/2016 | Doubleday | H04L 63/1433 |
| 2016/0381064 A1* | 12/2016 | Chan | H04L 63/104 |
| | | | 726/25 |
| 2017/0034018 A1* | 2/2017 | Parandehgheibi | H04L 41/046 |
| 2017/0060930 A1* | 3/2017 | Elkherj | G06F 16/248 |
| 2017/0078322 A1* | 3/2017 | Seiver | H04L 63/1433 |
| 2017/0085595 A1* | 3/2017 | Ng | G06Q 40/08 |
| 2017/0098086 A1* | 4/2017 | Hoernecke | G06F 21/577 |
| 2017/0149627 A1* | 5/2017 | Blondeau | H04L 41/5016 |
| 2017/0155676 A1* | 6/2017 | Tamir | G06F 21/50 |
| 2017/0220964 A1* | 8/2017 | Datta Ray | H04L 63/1433 |
| 2017/0244740 A1* | 8/2017 | Mahabir | H04L 63/1433 |
| 2017/0251013 A1* | 8/2017 | Kirti | H04L 63/1416 |
| 2017/0295197 A1* | 10/2017 | Parimi | H04L 67/10 |
| 2018/0026944 A1* | 1/2018 | Phillips | H04L 63/0263 |
| | | | 726/4 |
| 2018/0027006 A1* | 1/2018 | Zimmermann | H04L 63/0227 |
| | | | 726/11 |
| 2018/0124091 A1* | 5/2018 | Sweeney | H04L 63/1425 |
| 2018/0124095 A1* | 5/2018 | Hamdi | G06F 12/0868 |
| 2018/0167402 A1* | 6/2018 | Scheidler | G06F 21/552 |
| 2018/0219888 A1* | 8/2018 | Apostolopoulos | G06F 16/9024 |
| 2018/0232835 A1* | 8/2018 | Gordon | G06Q 30/0601 |
| 2018/0309775 A1* | 10/2018 | Zou | H04L 63/1416 |
| 2019/0098037 A1* | 3/2019 | Shenoy, Jr. | G06F 11/3006 |
| 2019/0132350 A1* | 5/2019 | Smith | G06F 21/60 |
| 2019/0147376 A1* | 5/2019 | Mahabir | G06Q 10/0635 |
| 2019/0188389 A1* | 6/2019 | Peled | G06F 3/147 |
| 2019/0236269 A1* | 8/2019 | Hay | G06F 21/577 |
| 2019/0236661 A1* | 8/2019 | Hogg | G06F 16/9537 |
| 2019/0245883 A1* | 8/2019 | Gorodissky | H04L 43/50 |
| 2020/0162517 A1* | 5/2020 | Wong | H04L 63/205 |

\* cited by examiner

| Status | Platform | Type | Account ID | Entity name |
|---|---|---|---|---|
| | aws | User | 419890133200 | Administrator |
| | aws | User | 419890133200 | Asaf |
| | aws | User | 419890133200 | Attacker_User |
| | aws | User | 419890133200 | Bill |
| | aws | User | 419890133200 | bob |
| | aws | User | 419890133200 | cli_user |
| | aws | User | 419890133200 | Cloud-Challenge-App |
| | aws | User | 419890133200 | Cloud-Challenge-User |
| | aws | User | 419890133200 | d-user |
| | aws | User | 419890133200 | DevOps_User |
| | aws | User | 419890133200 | Doron |
| | aws | User | 419890133200 | EC2_user |
| | aws | User | 419890133200 | EC2_user2 |

Administrator — High Severity, Platform aws, Type User, Account ID 419890133200

Recommendations Permissions

5857 Permissions

| Service name | Permissions | No. activities ↓ | Last used |
|---|---|---|---|
| acm | getcertificate | - | - |
| acm | requestcertificate | - | - |
| acm | addtagstocertificate | - | - |
| acm | listcertificates | - | - |
| acm | importcertificate | - | - |
| acm | updatecertificateoptions | - | - |
| acm | resendvalidationemail | - | - |
| acm | listtagsforcertificate | - | - |
| acm | deletecertificate | - | - |
| acm | renewcertificate | - | - |
| acm | exportcertificate | - | - |
| acm | describecertificate | - | - |
| acm | removetagsfromcertificate | - | - |

Cloud Entities — All cloud entities — Follow (4) — 244 results

*FIG. 10*

FIG. 11

MONITORING AND CONTROLLING RISK COMPLIANCE IN NETWORK ENVIRONMENTS

BACKGROUND

Enterprises increasingly utilize virtualized, or cloud-based, computing resources in their daily operations. Through frameworks such as Software-as-a-Service (SaaS), Infrastructure-as-a-Service (IaaS), Platform-as-a-Service (Paas), and others, businesses and other organizations rely on cloud computing platforms (e.g., Amazon's AWS™, Microsoft's Azure™, Google's Cloud Platform™, and others) to store data and applications, execute applications, perform computing functions, and interface with other network resources.

In many virtualized environments, particular tasks require privileged access rights. For example, access to a sensitive database may require an administrator's password or other credential. Further, specific actions (e.g., deleting a file, uploading software code, writing to sensitive memory, accessing sensitive applications, etc.) may require a password or other privileged access credential. Problems arise, however, when privileged access is granted at an unnecessarily high level to perform a particular task, is granted more broadly than needed, or is granted for an unnecessarily long time. For example, sometimes an application will need privileged access rights in order to read a particular file, but the actual privileged access that is granted may provide read, write, copy, and delete rights. In this situation, the write, copy, and delete rights may be unnecessary and consequently may increase the likelihood of the privileges being misused or improperly leveraged by an attacker. Similarly, if the application only needs read privileges for a particular task, in some situations the privileges are provided permanently, or until the credentials expire. This can also increase the likelihood of improper use of the credentials, since they may exist and form an attack surface for longer than needed.

These problems of overly-strong privileges and lingering privileges are especially acute in virtualized network environments. In these environments, virtual computing instances (e.g., virtual machines, container instances, serverless code instances, etc.) are often dynamically instantiated, modified, and deactivated. This makes it very difficult to monitor the level of privileged access rights that individual virtual resources have at any given moment. A further layer of difficulty is determining whether the privileged access rights that individual resources have are unnecessarily strong or long-lived. Indeed, in a machine-to-machine virtualized environment, where virtualized resources may be spun up or modified automatically, or through automated policies, the universe of virtualized resources and their privileged access rights may be constantly changing and not known.

In view of these technological problems associated with managing privileged access rights in virtualized network environments, technological solutions are needed to more efficiently, accurately, and dynamically detect the privileged access rights possessed by individual resources. Further, solutions should determine whether individual resources have a scope of privileged access rights that is unduly strong or long in duration. In addition, solutions should provide efficient techniques for responding to situations where resources have unnecessary privileges, including by suggesting particular actions and by automatically performing actions to implement least-privilege policies.

SUMMARY

The disclosed embodiments describe non-transitory computer readable media and methods for analyzing risk data for a plurality of network-based identities and generating interactive graphical user interfaces to allow for visualization of the risk data. For example, in an exemplary embodiment, there may be a non-transitory computer readable medium including instructions that, when executed by at least one processor, cause the at least one processor to perform operations for analyzing risk data for a plurality of network-based identities and generating interactive graphical user interfaces to allow for visualization of the risk data. The operations may comprise identifying a plurality of network-based identities that have been deployed in a network environment; identifying a scope of permissions associated with the plurality of network-based identities; determining a scope of activity of at least one of: use of the permissions, non-use of the permissions, or activity associated with the permissions for the plurality of network-based identities; developing, based on at least the identified scope of permissions and the determined scope of activity, risk statuses for the plurality of network-based identities; and generating a graphical user interface representing the risk statuses, the graphical user interface comprising a first graphical element having a size and a color, the size and the color being determined based on the risk statuses associated with a first platform within the network environment; wherein the graphical user interface further comprises a second graphical element having a size and a color, the size and the color being determined based on the risk statuses of network-based identities within the first platform; wherein at least one of the first or second graphical elements are selectable by a user, and upon selection the graphical user interface is configured to display at least: risk status information indicative of one or more of the plurality of network-based identities, and remedial action information indicating one or more actions to take in the network environment to adjust the risk status information for the one or more of the plurality of network-based identities.

According to a disclosed embodiment, the graphical user interface identifies a configurable threshold risk status for the plurality of network-based identities.

According to a disclosed embodiment, if the developed risk statuses for the plurality of network-based identities are determined to exceed the configurable threshold, the operations further comprise performing at least one of: adjusting a visual attribute of the first or second graphical elements, or displaying a prompt in the graphical user interface.

According to a disclosed embodiment, if the developed risk statuses for the plurality of network-based identities are determined to exceed the configurable threshold, the operations further comprise applying a least-privilege control action for at least a portion of the plurality of network-based identities.

According to a disclosed embodiment, determining the scope of activity associated with the permissions includes identifying a scope of actual activity and a scope of permitted activity.

According to a disclosed embodiment, the operations further comprise identifying, based on the scope of permitted activity, one or more of the plurality of network-based identities having administrator privileges.

According to a disclosed embodiment, the remedial action information includes a removal of privileges not used by the one or more of the plurality of network-based identities over a threshold period of time.

According to a disclosed embodiment, the remedial action information is displayed in conjunction with a selectable element, and upon selection of the selectable element the remedial action is performed in the network environment.

According to a disclosed embodiment, the operations further comprise developing platform-level risk statuses for the first network platform and a second network platform.

According to a disclosed embodiment, the operations further comprise developing an environment-level risk status for the network environment.

According to another disclosed embodiment, a method may be implemented for analyzing risk data for a plurality of network-based identities and generating interactive graphical user interfaces to allow for visualization of the risk data. The method may comprise identifying a plurality of network-based identities that have been deployed in a network environment; identifying a scope of permissions associated with the plurality of network-based identities; determining a scope of activity of at least one of: use of the permissions, non-use of the permissions, or activity associated with the permissions for the plurality of network-based identities; developing, based on at least the identified scope of permissions and the determined scope of activity, risk statuses for the plurality of network-based identities; and generating a graphical user interface representing the risk statuses, the graphical user interface comprising a first graphical element having a size and a color, the size and the color being determined based on the risk statuses associated with a first platform within the network environment; wherein the graphical user interface further comprises a second graphical element having a size and a color, the size and the color being determined based on the risk statuses of network-based identities within the first platform; wherein at least one of the first or second graphical elements are selectable by a user, and upon selection the graphical user interface is configured to display at least: risk status information indicative of one or more of the plurality of network-based identities, and remedial action information indicating one or more actions to take in the network environment to adjust the risk status information for the one or more of the plurality of network-based identities.

According to another disclosed embodiment, the method further comprises maintaining a plurality of permission threshold levels for the plurality of network-based identities.

According to another disclosed embodiment, at least one of the size or the color of the first graphical element is determined based on the plurality of permission threshold levels.

According to another disclosed embodiment, if the developed risk statuses for the plurality of network-based identities are determined to exceed one or more of the plurality of permission threshold levels, the operations further comprise applying a least-privilege control action for at least a portion of the plurality of network-based identities.

According to another disclosed embodiment, the remedial action information is unique as to a particular one of the plurality of network-based identities.

According to another disclosed embodiment, the remedial action information is unique as to a group of the plurality of network-based identities.

According to another disclosed embodiment, the method identifying new network-based identities added to the network environment, and automatically developing risk statuses for the new network-based identities.

According to another disclosed embodiment, the remedial action information is displayed in conjunction with a selectable element, and upon selection the remedial action is performed in the network environment.

According to another disclosed embodiment, the first graphical element is associated with a particular virtual computing orchestration platform.

According to another disclosed embodiment, the method developing platform-level risk statuses for the first network platform and a second network platform.

Aspects of the disclosed embodiments may include tangible computer-readable media that store software instructions that, when executed by one or more processors, are configured for and capable of performing and executing one or more of the methods, operations, and the like consistent with the disclosed embodiments. Also, aspects of the disclosed embodiments may be performed by one or more processors that are configured as special-purpose processor(s) based on software instructions that are programmed with logic and instructions that perform, when executed, one or more operations consistent with the disclosed embodiments.

It is to be understood that both the foregoing general description and the following detailed description are exemplary and explanatory only, and are not restrictive of the disclosed embodiments, as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings:

FIG. 8 is an illustration of an exemplary user interface for identifying recommendations for reducing unused or overly broad privilege risk for a first virtualized network resource in accordance with disclosed embodiments.

FIG. 9 is an illustration of an exemplary user interface for identifying unused or overly broad privileges for a first virtualized network resource in accordance with disclosed embodiments.

FIG. 10 is an illustration of an exemplary user interface for identifying recommendations for reducing unused or overly broad privilege risk for a second virtualized network resource in accordance with disclosed embodiments.

FIG. 11 is an illustration of an exemplary user interface for identifying unused or overly broad privileges for a second virtualized network resource in accordance with disclosed embodiments.

DETAILED DESCRIPTION

In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are not constrained to a particular order or sequence, or constrained to a particular system configuration. Additionally, some of the described embodiments or elements thereof can occur or be performed simultaneously, at the same point in time, or concurrently.

The various implementations described herein overcome several technological problems in the fields of permissions-based access management, privileged risk analysis, and remediation of privilege risks in dynamic network environments. As discussed below, techniques include analyzing risk data for one or more virtualized computing environments. The analysis may involve determining a scope of permissions associated with individual computing resources and comparing the scope to the actual use (or non-use) of privileges, and to activity performed using the permissions. Based on this analysis, the scope of unnecessary or unused privileges may be assessed.

In order to effectively display data regarding the scope of unnecessary or unused privileges, techniques may further include generating user interfaces that graphically depict virtualized resources and their corresponding privilege risks. A variety of graphical representation formats may be used to convey privilege risk, such as colors, shapes, shading, color gradients, opacity, three-dimensional content, movement, animation, and more. The graphical user interfaces may be interactive, allowing for the selection of individual elements (e.g., a particular virtualized platform), individual sub-elements (e.g., a particular virtual machine or container instance), and activity performed by individual resources. The graphical user interfaces may also provide interactive techniques for displaying recommended fixes or corrections for privilege risks. Further, the graphical user interfaces may implement automatic control actions to respond to privilege risks.

Reference will now be made in detail to the disclosed embodiments, examples of which are illustrated in the accompanying drawings.

Figure 1:
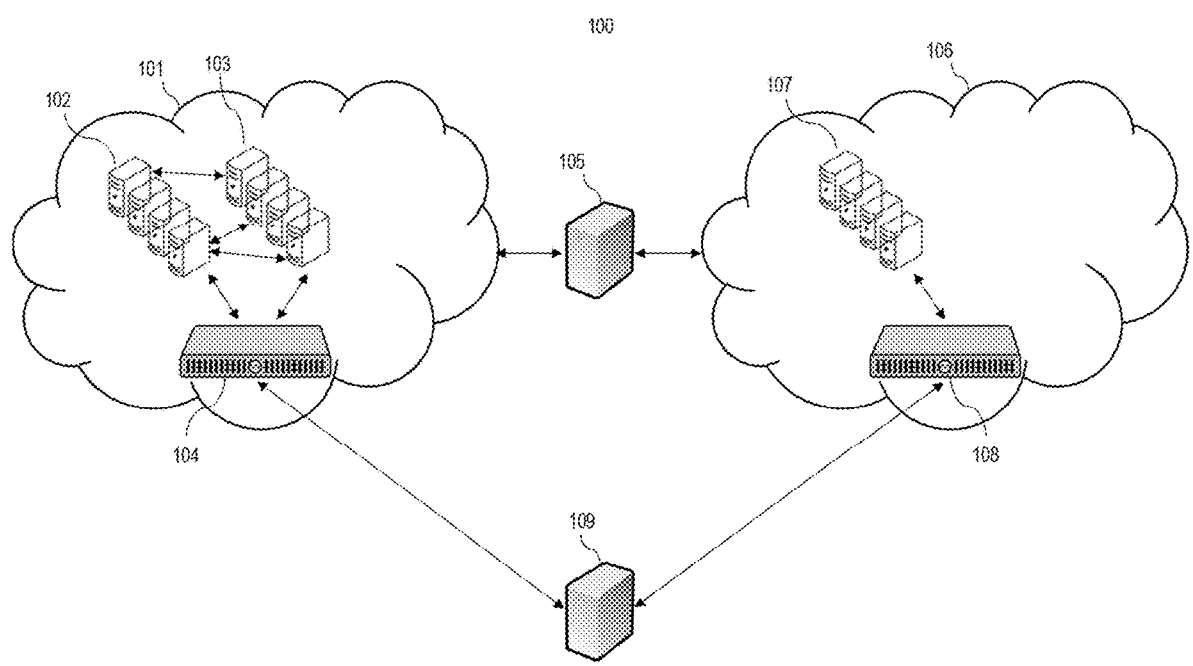
FIG. 1 is a block diagram of an example system for analyzing risk data for a plurality of network-based identities and generating interactive graphical user interfaces to allow for visualization of the risk data in accordance with disclosed embodiments.

FIG. 1 depicts an exemplary system 100 for analyzing risk data for a plurality of network-based identities and generating interactive graphical user interfaces to allow for visualization of the risk data, consistent with disclosed embodiments. System 100 can include virtualized network environments 101 and 106, each having one or more group of one or more virtual computing instances 102, 103, 107. Virtualized computing environments 101 and 106 may each be based on one or more cloud orchestration platforms 104 and 108. Further, virtual computing instances 102, 103, 107 may receive elevated privileges (or may have their privileges lowered) by privileged access server 105. As discussed further below, the risk analysis processes disclosed herein may be performed by security server 109. In alternate embodiments, cloud orchestration platforms 104 and 108 themselves may perform the disclosed risk analysis and remediation processes.

Virtualized computing networks 101 and 106 may be built on a variety of types of cloud computing infrastructure. For example, their constituent virtual resources 102, 103, 107 may be deployed based on infrastructure of AWS™, Azure™ IBM Cloud™ Kubernetes™ VMWare™ or various others. Accordingly, in such embodiments virtual resources 102, 103, 107 may take one or several different forms, such as virtual machines, Docker™ containers, Java™ containers, Linux containers, Apaches Mesos™ containers, AWS™ Lambda serverless code instances, Azure Data Lake™ instances, IBM Cloud Functions™ instances, and various others. In some embodiments, the levels of privileges held by individual virtual resources in networks 101 and 106 may be discovered using tools such as AWS Identity and Access Management (IAM)™, Azure Active Directory (AD) Privileged Identity Management (PIM)™, IBM Privileged Access Management™, or others. For example, consistent with system 100, these tools may be used to determine what privileged access rights (e.g., level of rights, duration of rights, etc.) have been granted to virtual resources 102, 103, 107, and what privileged access rights the virtual resources 102, 103, 107 actually use over a defined period of time (e.g., one day, one month, etc.). This information regarding the scope of granted privileges, and the scope of used privileges, may be reported to security server 109 (e.g., from orchestration tools 104, 108) and analyzed as discussed further below. Alternatively, in some embodiments the types of analysis described below may occur at orchestration tools 104, 108 themselves.

Of course, while system 100 is illustrated as including two virtual computing networks 101, 106, in some embodiments there may be additional or fewer virtual computing networks. The individual virtual computing networks may be based on the same, or different, cloud platforms. Further, the individual virtual instances 102, 103, 107 in each virtual network 101, 106 may be based on a single, or multiple, cloud computing platforms. While system 100 is described here as being based on virtual computing platform architecture, in some embodiments computing networks 101, 106 may be in whole, or in part, based on on-premises (e.g., local corporate) networks. Accordingly, networks 101, 106 may be entirely on-premises, entirely cloud-based, or both (e.g., hybrids).

In virtual computing environments 101, 106, individual virtual computing resources 102, 103, 107 may be various types of computing resources. For example, individual resources 102, 103, 107 may be applications, databases, software code, files, or various other types of resources. While in some embodiments virtual resources 102, 103, 107 may exist entirely in the cloud, in some embodiments virtual resources 102, 103, 107 may have real-world devices that they are associated with. For example, virtual resources 102, 103, 107 may be applications that run in networks 101, 106, but that control equipment such as a network-connected automobile, a video surveillance camera, a parking garage control station, a laptop computer, a smart home appliance, or various other IoT-type devices. In some embodiments, some or all of virtual computing resources 102, 103, 107 may require authentication, such as through the use of a privileged credential (e.g., password, SSH key, symmetric (e.g., public/private) key, or other type of cryptographic data or privileged access token) in order to access each other, or to access external computing resources.

The privileged access that is granted to virtual computing resources 102, 103, 107 may be achieved in several ways. For example, in some embodiments cloud orchestration tools 104, 108 are configured to grant, monitor, and revoke privileged access rights given to virtual computing resources 102, 103, 107. Alternatively, or in addition, in some embodiments privileged access server 105 may operate to grant, monitor, and revoke privileged access rights for virtual computing resources 102, 103, 107. In such a situation, privileged access server 105 may be an Endpoint Privilege Manager server, an Enterprise Password Vault, or an Application Access Manager server, as provided by CyberArk™. In such implementations, privileged access server 105 may be configured to maintain privileged access credentials for use by virtual computing resources 102, 103, 107 in communicating with access-protected resources (either internal to networks 101, 106, or external). For added security, the privileged credentials maintained by the privileged access server 105 may be encrypted, may be periodically rotated and refreshed, or may be rotated and refreshed upon detection of potential security vulnerabilities or attacks affecting networks 101, 106.

In some embodiments, virtual computing resources 102, 103, 107 may each have one or more identity. Such identities may be an account, user, machine, IoT device, application, or other entity attempting to operate or control virtual computing resources 102, 103, 107. In some embodiments, the identities may be automated and/or computerized (e.g., based on an automated workflow, a DevOps process, etc.). For example, an automated identity may be a scheduled backup service, data access task, or other process performed by one or more virtual computing resources 102, 103, 107. Identities may be, for example, local accounts on a computer or computer system that is established according to a particular operating system (e.g., Microsoft Windows®, Mac OS®, UNIX, etc.), a particular security service, or another service or protocol. Identities may also be network accounts, such as accounts established according to a network operating system (e.g., a Microsoft® network operating system, a Cisco® network operating system, a Dell® network operating system, a Linux network operating system, etc.). Further, network account identities may be established based on network security protocols or services. In addition, identities may be instances of a virtual machine or container running in virtualized computing environments 101, 106. Further, identities may also be tokens or unique identifiers used to identify a particular computing resource, person, account, virtual machine, container, or other entity accessing a computer or network.

In some embodiments, orchestration tools 104, 108, or security server 109 itself, may be configured to receive reports of the scope of privileged access rights granted to virtual computing resources 102, 103, 107, and activity involving privileged access rights by virtual computing resources 102, 103, 107. For example, reports of actual use of privileges, non-use of privileges, or activity involving privileges (e.g., requests for access to privileged resources) may be captured automatically or in response to a user command or system command (e.g., a command issued by an application, an instance of an application, an API, a system call, etc.). As an example of an automatic operation, orchestration tools 104, 108, or security server 109, can be scheduled to discover and evaluate privileged identities among virtual computing resources 102, 103, 107 repeatedly, intermittently, or periodically. As a further example, this detection process may involve real-time detection using a web hook (e.g., a Cloud Hook™ or Serverless Cloud Function™, etc.). The web hook can trigger a report to orchestration tools 104, 108 or to security server 109 upon creation of a new virtual identity, or upon activity by a virtual identity. In such aspects, upon creation of (or activity by) the new virtual identity, orchestration tools 104, 108 or security server 109 can be configured to evaluate the privileges of the new identity. Further, in some embodiments virtual computing resources 102, 103, 107 may interface with a proxy server that is configured to send reports to orchestration tools 104, 108, or security server 109, when privileged access requests are involved. For example, the proxy server may monitor communications from certain (or all) of virtual computing resources 102, 103, 107 that are known to be privileged, or communications to particular resources known to be privileged by virtual computing resources 102, 103, 107. In those situations, the proxy server may send reports to orchestration tools 104, 108, or security server 109, identifying the individual virtual computing resources 102, 103, 107 involved, the external resource(s) they are communicating with, packet header information, packet payload information, assertion of privileged credentials, requests for access to privileged access server 105, date and time, and other information.

The information gathered from virtual computing resources 102, 103, 107 regarding their assigned privileges, and their privileged access activity, may be stored in one or more databases. For example, orchestration tools 101, 106 or security server 109 may maintain one or more databases to store such information. By way of example, the databases may include Oracle™ databases, Sybase™ databases, or other relational databases or non-relational databases, such as Hadoop sequence files, HBase, or Cassandra. The databases or other files may include, for example, identities associated with virtual computing resources 102, 103, 107, network resources accessed by identities, identities' attempts to access privileged network resources, identities' attempts to access privileged access server 105, and the like. The disclosed embodiments, however, are not limited to particular locations or types of databases.

Privileged access server 105 can be configured to receive policy information concerning identity activity in virtual environments 101, 106. In some embodiments, for example, privileged access server 105 can be configured to receive policy information while generating information on privilege usage of one or more identities. According to the one or more security policies maintained by privileged access server 105, individual identities among virtual computing resources 102, 103, 107 can receive new privileges, enlarged privileges (e.g., in strength), prolonged privileges (e.g., in duration), lowered privileges, or revoked privileges. As discussed above, the security policies implemented by privileged access server 105 may be static (e.g., rules-based) or dynamic in nature. Dynamic policies may account for, for example, detected threats to virtual environments 101, 106, anomalous or suspicious activity by virtual computing resources 102, 103, 107, or other changing factors.

Privileged access server 105 can be configured to maintain these permission policies as stored data and/or instructions. As a non-limiting example, the permission policies can be maintained in JSON objects and/or XML documents, or according to other formats. In some aspects, the permission policies can be assigned to an identity among virtual computing resources 102, 103, 107, for example by associating a policy defining permissions with the identity. In various aspects, a permission policy can be specified, referenced, or included in the definition of the identity. In some embodiments, a cloud permission policy can indicate an effect (whether the policy allows or denies an action), a list of one or more actions permitted or denied by the permission policy, or a list of one or more network resources upon which one of the listed actions can be performed. For example, when the network environment is AWS™, a permission policy associated with a role can allow the role to perform a "ListBucket" action on an Amazon S3™ bucket. As an additional example, another permission policy associated with a user can allow the user to assume this role. Then the user can perform the LISTBUCKET action on the Amazon S3™ bucket. The following non-limiting example depicts an exemplary permission policy as implemented by AWS™:

{"Statement": {
"Effect": "Allow",
"Action": "s3:ListBucket",
"Resource": "arn:aws:s3:::example_bucket"
}}

As shown, this permission policy allows the action "listbucket" to be performed on the Amazon S3™ bucket "example_bucket".

In accordance with system 100, orchestration tools 104, 108 may be (or may be based on) a variety of different types of cloud management software. For example, orchestration tools 104, 108 may be based on OpenStack™, Apache CloudStack™, Wrike™, IBM Cloud Orchestrator™, AppFormix™ and more. Consistent with the above discussion, orchestration tools 104, 108 may monitor activity in virtualized environments 101, 106. For example, orchestration tools 104, 108 may monitor (or control) the spinning up of new virtual instances 102, 103, 107, may provide elevated or reduced privileges to virtual instances 102, 103, 107, may request elevated or reduced privileges from privileged access server 105 for virtual instances 102, 103, 107, may monitor use of privileged credentials by (or to) virtual instances 102, 103, 106, and may perform other operations in environments 101, 106.

Figure 2:
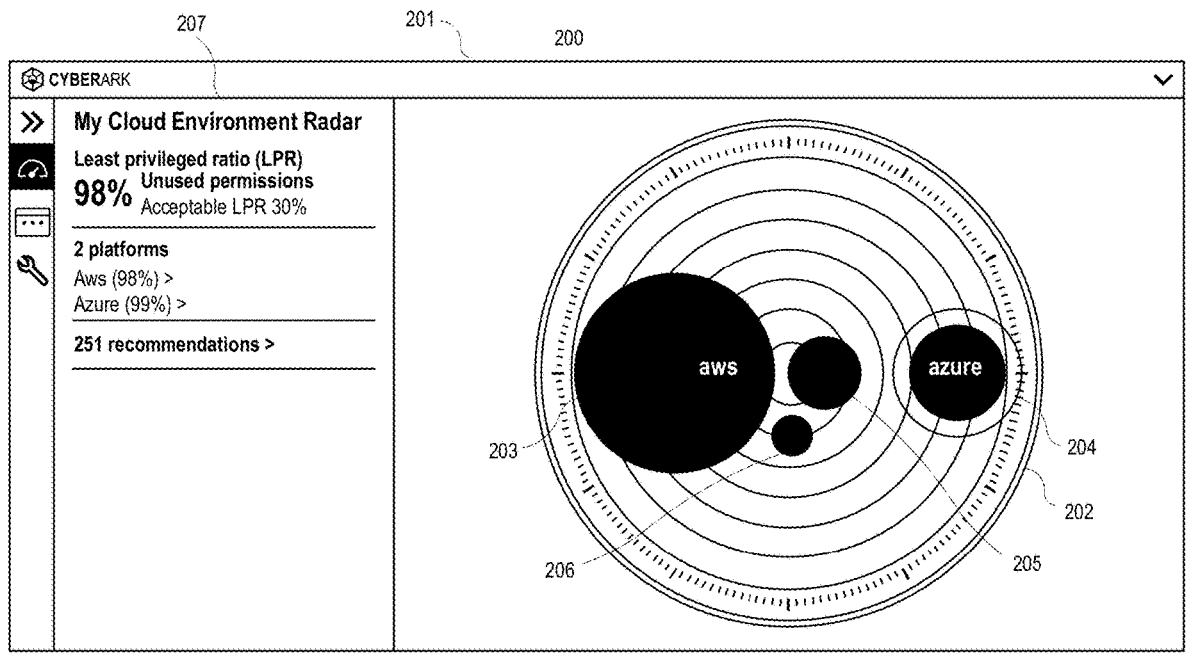
FIG. 2 is an illustration of an exemplary user interface for analyzing risk data regarding virtualized network platforms in accordance with disclosed embodiments.

FIG. 2 illustrates an exemplary user interface 200 for analyzing risk data regarding virtualized network platforms. In accordance with above embodiments, interface 200 may be generated by security server 109, or by orchestration tools 104, 108. For example, interface 200 may be generated as part of a proprietary application interface (e.g., using Java™, JavaScript™, Python™, C #, PHP, etc.). Further, in some embodiments interface 200 may be a web page document, or intranet document, capable of being rendered in a browser (e.g., Internet Explorer™, Chrome™ Firefox™ Safari™, etc.).

As illustrated in FIG. 2, interface 200 may include a window 201 or other sub-interface of interface 200 for displaying data regarding a privileged risk assessment for virtual computing resources. For example, in FIG. 2, four different virtual computing platforms are depicted, as circles in radar display 202. These four different virtual computing platforms may correspond to virtual computing platforms 102, 103, 107 of FIG. 1. They may include, for example, an AWS™ virtual computing platform 203, an Azure™ virtual computing platform 204, and two other virtual computing platforms 205, 206. In accordance with FIG. 2, the different virtual computing platforms being assessed may have different numbers of constituent virtual instances. The relative number of virtual instances in each platform may be represented graphically, such as through the size, color, opacity, texture, three-dimensional content, movement, animation, or other graphical characteristics of interface 200. For example, in the depicted example, AWS™ virtual computing platform 203 may have a larger number of constituent virtual instances than Azure™ virtual computing platform 204. Accordingly, the circle representing AWS™ virtual computing platform 203 may be larger than that for Azure™ virtual computing platform 204. As noted, however, other visual characteristics (e.g., color, opacity, texture, three-dimensional content, or other graphical characteristics) may also be used to represent the number of constituent instances in each platform. These visual characteristics may be determined, for example, based on a current number of virtual instances in each platform. Alternatively, they may be based on a current number of privileged instances in each platform (i.e., excluding non-privileged instances). Further, in some embodiments, the visual characteristics may not represent current numbers of virtual instances, but instead may represent historical data. For example, if security server 109 (or orchestration tools 104, 108) maintains (e.g., in a database) historical data regarding numbers of virtual instances in each platform, or historical data regarding numbers of privileged virtual instances in each platform, that historical data may be represented in interface 200 as well. In such embodiments, interface 200 may include a selectable toggle button, or sliding bar, to select a particular time (e.g., current, one day ago, one month ago, etc.) on which the visual characteristics in interface 200 are based. Alternatively, interface 200 may allow entry of a particular date, or selection of a particular date, for viewing historical or current data.

In some embodiments, interface 200 further includes a "My Cloud Environment Radar" interface 207, or a like interface for displaying information regarding the virtual computing platform being assessed in a given environment. As illustrated, interface 207 may identify an overall least-privileged ratio (LPR) or score across the four virtual computing platforms being assessed. In the example shown, the overall LPR is 98%, while an acceptable LPR is 30%. Techniques for computing and displaying the LPR, and setting acceptable baselines or thresholds for LPR, are further discussed below. In addition, interface 207 may display information regarding the number of platforms being assessed (e.g., two of the four platforms), their platform types (e.g., AWS™ and Azure™), and particular recommendations for addressing the LPR scores in the platforms. Techniques for generating recommendations are discussed further below.

In some embodiments, the LPR depicted in interface 200 is developed by comparing a scope of granted privileges across virtual computing instances to the actually used (or not used) privileges by those instances. This may involve, for example, security server 109 (or orchestration tools 104, 108) obtaining the permissions policies governing instances 102, 103, 107. This may include querying, via an API, an identity management service setting the privileged access rights for instances 102, 103, 107. As discussed above, examples of this identity management service may include AWS Identity and Access Management (IAM)™, Azure Active Directory (AD) Privileged Identity Management (PIM)™, IBM Privileged Access Management™, or others. Further, in an on-premises environment, this may include querying an Active Directory™ listing for the environment, the output of a CyberArk DNA™ scan, or other types of privileged capabilities reports. Based on this data, the security server 109 (or orchestration tools 104, 108) may determine the scope of granted privileges for instances 102, 103, 107. The scope may be expressed as a numerical level or ranking of privileges (e.g., 1-5), a category of privileges (e.g., root, administrator, normal user, guest, etc.), or by the actual privileges themselves (e.g., read, write, modify, delete, access to particular other resources, access at particular times or days, access to privileged access server 105, etc.). Further, the scope may be expressed in terms of duration as well. This may identify for how long the privileges are assigned to instances 102, 103, 107. Accordingly, if privileges are permanently granted, are granted for a defined time interval (e.g., seconds, days, etc.), or are granted for a particular connection session, that information may be gathered as well. As discussed above, in some embodiments security server 109 may track in a database historical versions of this scope data. For example, the database may be organized based on virtual instance identifiers, and may indicate the scope of privileges assigned to individual virtual instances over time.

In order to develop the LPR score or ranking shown in FIG. 2, the security sever 109 (or orchestration tools 104, 108) may compare the scope of privileged access that instances 102, 103, 107 have with the scope that they actually use (or don't use), or with their actions involving privileged access. For example, this may involve analyzing information describing activity associated with individual instances 102, 103, 107. The activity associated with the instances 102, 103, 107 may include particular actions they have taken, or that have been taken on them, with respect to particular network resources. The activity may be associated with the instances 102, 103, 107 on the basis of, for example, the activity being a historical activity of the instances 102, 103, 107, the activity being identified based on source code of an application associated with the instances 102, 103, 107, or the activity being associated with others of the instances 102, 103, 107 determined to be similar to the instances 102, 103, 107. For example, this may involve identifying network resources that instances 102, 103, 107 have accessed in a specified time period (e.g., the last hour, day, month, six months, etc.). Further, a particular application to which the instances 102, 103, 107 are allowed access may be analyzed. In some situations, the source code for the application may indicate certain network resources that the identity is permitted to access using the application (e.g., they may have a hardcoded network address or other resource identifier in the source code). Further, the instances 102, 103, 107 may be compared to other instances 102, 103, 107, such that the instances 102, 103, 107 are classified in the same group as other similar instances. This may be based on, for example, a privilege classification of the instances 102, 103, 107, a creation time of the instances 102, 103, 107, roles of the instances 102, 103, 107, creators of the instances 102, 103, 107, functions of the instances 102, 103, 107, etc. Once a similar instance is identified, its activity may be associated with other instances 102, 103, 107 sharing the similarity.

Historical activity of instances 102, 103, 107 may include records stored in a database (e.g., maintained by security server 109, or by orchestration tools 104, 108). Such a database may be populated with information identifying instances' 102, 103, 107 actions in network environments 101, 106, or in communicating with external networks. For example, historical information may describe a frequency with which a particular action (e.g., request for access, downloading of data, uploading of data, modifying files, etc.) was taken by the instances 102, 103, 107 with respect to a particular network resource.

In some embodiments, analyzing the scope of privileged activity performed by instances 102, 103, 107 may include one or more of machine learning analysis, statistical analysis, applying the information to an algorithm, or applying the information to a neural network. Additionally, in some embodiments, the process may include one or more steps to normalize and clean the information prior to analysis. This may harmonize data having different formats (e.g., different time zones, different expressions of network address information, different expressions of network actions, different expressions of privileged access actions, etc.). In some embodiments, the analysis may occur for a defined, but adjustable duration of time. For example, a user may adjust the duration of time, via a graphical user interface (GUI) such as interface 200. The process may analyze this privileged activity information collected in a particular week, month, year, or other timespan.

In computing the LPR shown in interface 207, the security server 109 (or orchestration tools 104, 108) may automatically develop, based on the analysis of the scope of privileges and used (or unused) privileges, a least-privilege profile for individual identities among virtual instances 102, 103, 107. The least-privilege profile for individual identities may include permissions corresponding to the particular actions those identities have taken with respect to particular network resources, and may exclude permissions that do not correspond to the particular actions with respect to the particular network resources. As discussed above, the actions may be based on a variety of sources, such as the actual activity of the identities, activity indicated by source code from an application associated with the identities or their instances, or activity of other identities deemed similar to the identities.

In some embodiments, the least-privilege profiles for instances 102, 103, 107 may include a least-privilege score. The least-privilege score may be developed based on a comparison of the available privileges each identity has to the actual used (or unused) privileges each identity has. For example, an identity executing all actions permitted by the identity's permission policy may have a higher least-privilege score than an identity executing only a subset of their allowed actions. For the latter instance, there may be a substantial amount of unnecessary privileges, either in terms of privilege strength or privilege duration.

The least-privilege score, also referred to as a risk status herein, may be expressed numerically in some embodiments. For example, the following formula may be used for a single virtual instance or identity: Instance LPR=U/N, where LPR is the least-privilege score, U is the amount (e.g., number) of used privileges, and N is the amount (e.g., number) of total privileges. As an example, if an identity has 100 privileges, and uses only two, the result may be a 98% LPR score. For an account, which may comprise a plurality of individual instances, the formula may be: Account LPR=Σ(LPR)/X, where the LPR is the cumulative LPR scores of the instances within the account, and X is the number of instances or identities within the account. The result may be the average LPR across the instances or identities. For an entire platform of instances (e.g., an entire AWS™ platform, or an entire mixed AWS™/Azure™ platform in a defined network), the overall LPR may be computed as follows: Platform LPR=Σ(LPR)/Y, where the LPR is the cumulative LPR among all accounts in the platform (each, potentially, having multiple instances), and Y is the number of accounts. Further, an overall environment LPR may be developed as follows: Overall LPR=Σ(LPR)/Z, where the LPR is the cumulative LPR among all platforms, and Z is the number of platforms. In some embodiments, a default or target LPR may be set for individual instances, accounts, platforms, or environments. For example, a target LPR may be 30% in some embodiments. The target LPR may be set to a lower level (e.g., 5% or even 1%) for highly sensitive or highly deterministic environments. By contrast, less sensitive or more unpredictable environments may have higher threshold scores.

In some embodiments, security server 109 (or orchestration tools 104, 108) may determine an overall least-privilege score for a group of several instances (e.g., for instances 107, or for a group of instances 102 and 103 together). An overall least-privilege score (e.g., as shown in interface 207) may enable an organization to evaluate its compliance with certain standards or thresholds (e.g., an overall 30% target score). For example, a high least-privilege score may alert an organization that associated identities have many unused permissions, resulting in a less secure network environment. An organization may be able to evaluate the relative effectiveness of its permissions management based on the overall least-privilege score. An organization may be able to implement a new permissions rule, for example, by restricting access to a certain network resource, and evaluating, based on changes in the least-privilege score, whether the new rule increased or decreased the security of the organization's network environment. Additionally, an organization may be able to publish its least-privilege score to enable potential customers or partners to evaluate its network security.

According to some embodiments, the security server 109 (or orchestration tools 104, 108) may enforce the least-privilege profile for individual virtual instances. For example, enforcing the least-privilege profile may include permitting a particular instance to take actions based on the included permissions, such as accessing network resources, performing actions in a network, accessing certain applications, modifying certain files, etc. It may also include disallowing the instance to take actions based on the excluded permissions. Further, enforcing the least-privilege profile may include conditioning the ability of the instance to take actions based on the excluded permissions. This may involve, for example, requiring the instance to authenticate itself, asking another instance or a separate identity (e.g., network administrator) to approve the actions, etc. In addition, enforcing the least-privilege profile may include simulating an application of the least-privilege profile to actions taken by an instance. For example, once the least-privilege profile is created, a simulated enforcement of it may be created, to show how the least-privilege profile would operate in effect, while not actually operating to control activities of the instance. Simulating the operation of the least-privilege profile in this manner may assist in analyzing and visualizing the impact of the least-privilege profile, which may further allow for adjusting or fine-tuning the least-privilege profile or its enforcement.

In some embodiments, security server 109 (or orchestrator tools 104, 108) may monitor, modify, and/or revoke permissions or permission policies via an interface, as described further below. For example, security server 109 may construct and display a permissions graph (e.g., within radar interface 202) to an administrator identity, as discussed further below. The permissions graph may enable visualization of the least-privilege profile for an identity or virtual instance, an account, or an entire platform of accounts. In some embodiments, the permissions graph may be generated automatically based on data regarding virtual instances that is provided from orchestration tools 104, 108, as discussed above. The permissions graph may be generated by a privilege management system, e.g., security server 109 or privileged access server 105. In some embodiments, the permissions graph may be displayed via an interface, such as interface 200, and may provide a visualization of identity privileges.

To build the permissions graph, security server 109 may query orchestration tools 104, 108 for all available virtual instances and their corresponding permissions, as well as data indicating their actual usage (or non-usage) of privileged credentials. As discussed above, the query may occur in several ways, such as to AWS Identity and Access Management (IAM)™, Azure Active Directory (AD) Privileged Identity Management (PIM)™, IBM Privileged Access Management™, or other privilege management applications. For example, in AWS™ environments, queries may include:

"ListUsers"—AWS™ will respond back to the API caller the list of users in the current AWS™ environment.

"ListUserPolicies"—AWS™ will respond with the inline permission policy for a given identity.

"GetUserPolicy"—AWS™ returns the full JSON data of the permission policy for a given identity and policy name.

As discussed above, the least-privilege status of virtual instances, accounts, and platforms in interface 200 may be represented graphically in a variety of ways. For example, in some embodiments the size (e.g., relative or absolute size) of graphical elements may be proportional to the number of instances corresponding to each element. That is, the size of AWS™ platform element 203 and Azure™ platform element 204 may be proportional to the number of instances in each platform. Further, the size of AWS™ platform element 203 and Azure™ platform element 204 may be proportional to the number of privileged instances in each platform. Alternatively, the size of AWS™ platform element 203 and Azure™ platform element 204 may be proportional to a number of instances in each platform that have a least-privilege score exceeding a threshold level (e.g., 30%).

Variations are possible as well. For example, rather than (or in addition to) size, color may be used as a differentiating factor in interface 200. In some embodiments, a darker color (or darker share of a color) may be used to represent a higher least-privilege score, and a lighter color (or shade) may represent a lower least-privilege score. As an illustration, least-privilege scores above a threshold (e.g., 30%) may be red, or gradations of orange to red, while scores below the threshold may be green, white, etc. Alternatively, the texture or gradient of a color may be adjusted to indicate the degree of least-privilege scores for a particular instance, account, or platform. In some embodiments, a three-dimensional attribute (e.g., a depth) may be used to indicate a degree of least-privilege scores. In embodiments where a combination of color and size are used for displayed elements, the size of each element may represent the number of virtual instances or accounts within a platform (or the number of instances within an account), and the color may represent the least-privilege score or ranking for the platform or account.

Figure 3:
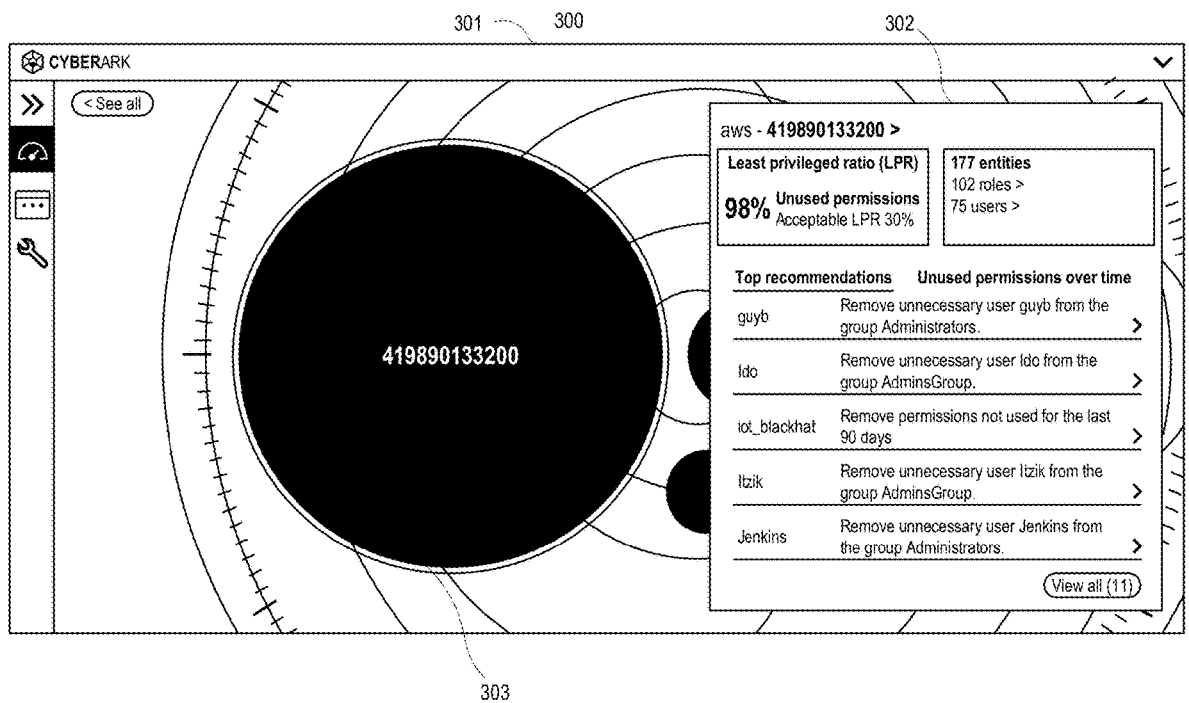
FIG. 3 is an illustration of an exemplary user interface for analyzing detailed risk data regarding a first virtualized network platform in accordance with disclosed embodiments.

FIG. 3 illustrates an exemplary user interface 300 for analyzing detailed risk data regarding a first virtualized network platform. In comparison to FIG. 2, interface 300 may provide a more detailed view regarding the accounts or identities that comprise AWS™ platform 203, which is shown as AWS™ platform 303 in FIG. 3. Accordingly, interface 300 may be reached by selecting (e.g., clicking, touching, or otherwise indicating) the AWS™ platform 203 from interface 200. Upon the selection, the interface 300 may appear, which provides various detailed information regarding AWS™ platform 203. Interface 300 may include a window or other sub-interface 301, similar to window or sub-interface 201 discussed above. Further, interface 300 may include an action window or sub-interface 302.

Action window or sub-interface 302 may include, for example, a resource identifier (e.g., "419890133200") associated with AWS™ platform 303, an overall least-privilege score (e.g., 98%) for AWS™ platform 303, a configurable threshold least-privilege score (e.g., 30%) for AWS™ platform 303, data on the number of entities (e.g., accounts or virtual instances) within AWS™ platform 303, recommendations for addressing least-privilege issues in AWS™ platform 303, and identifications of unused permissions over time. The recommendations may identify specific actions that may be performed (e.g., either automatically or upon selection) in order to improve the least-privilege score for AWS™ platform 303. For example, one recommendation in interface 302 may be for a particular identity ("guyb") to be removed from a particular group ("Administrators"). A further recommendation may be to remove identity "Ido" from the group "AdminsGroup." Another recommendation may be to remove permissions from "iot_blackhat" that were not used in the last 90 days. Further, a recommendation may be to remove "Itzik" from the "AdminsGroup" group. Additionally, "Jenkins" may be recommended to be removed from the group "Administrators." Action window or sub-interface 302 may also include a selectable field of "Unused permissions over time," or the like, which may identify unused permissions for individual accounts or virtual instances in AWS™ platform 303. As discussed above, this historical view may cover a selectable time period (e.g., the last day, week, month, etc.), which may be selectable by entering a date range, duration, etc.

In some embodiments, the recommendations within window or sub-interface 302 are selectable (e.g., by clicking, touching, or otherwise indicating the field in which they appear, or the arrow to the right of each field). Upon selection, a prompt may appear confirming whether the recommendation should be implemented. Alternatively, the selection of each recommendation may implement the recommendation without a prompt. As discussed further below, each recommendation may be implemented by security server 109, or orchestration tools 104, 108. For example, security server 109 or orchestration tools 104, 108 may directly grant, modify, or revoke privileges or privileged group memberships for virtual instances 102, 103, 107. Further, security server 109 or orchestration tools 104, 108 may prompt privileged access server 105 to grant, modify, or revoke privileges or privileged group memberships.

Figure 4:
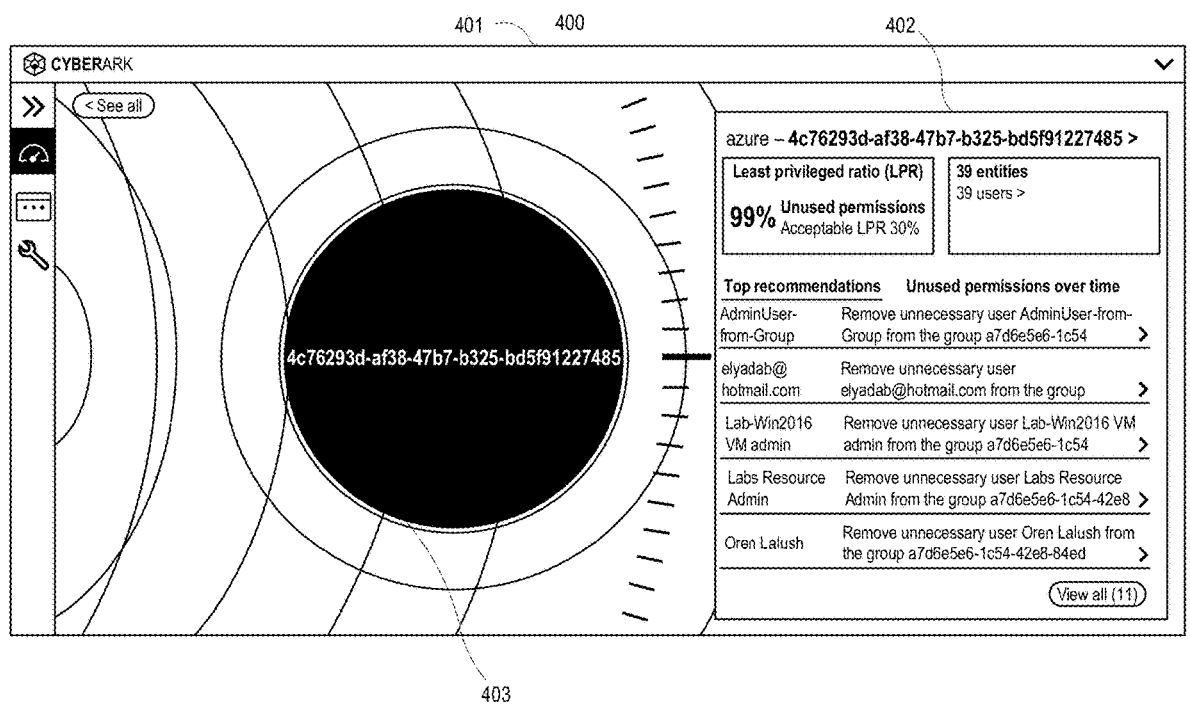
FIG. 4 is an illustration of an exemplary user interface for analyzing detailed risk data regarding a second virtualized network platform in accordance with disclosed embodiments.

FIG. 4 illustrates an exemplary user interface 400 for analyzing detailed risk data regarding a second virtualized network platform. With reference to FIG. 2, interface 400 may provide a more detailed view regarding the accounts or virtual identities that comprise Azure™ platform 204, which is shown as Azure™ platform 403 in FIG. 3. Consistent with the discussion above, interface 400 may be reached by selecting (e.g., clicking, touching, or otherwise indicating) the Azure™ platform 204 from interface 200. Upon the selection, the interface 400 may appear, which provides various detailed information regarding Azure™ platform 403. Interface 400 may include a window or other sub-interface 401, similar to windows or sub-interfaces 201, 301 discussed above. Further, interface 400 may include an action window or sub-interface 402.

Action window or sub-interface 402 may include, for example, a resource identifier (e.g., "4c76293d-af38-47b7-b325-bd5f91227485") associated with Azure™ platform 403, an overall least-privilege score (e.g., 99%) for Azure™ platform 403, a configurable threshold least-privilege score (e.g., 30%) for Azure™ platform 403, data on the number of entities (e.g., accounts or virtual instances) within Azure™ platform 403, recommendations for addressing least-privilege risks in Azure™ platform 403, and identifications of unused permissions over time. As discussed above, the recommendations may identify specific actions that may be performed (e.g., either automatically or upon selection) in order to improve the least-privilege score for Azure™ platform 403. For example, one recommendation in interface 402 may be to remove identity "AdminUser-from-Group" from the group "a7d6e5e6-1c54." A further recommendation may be to remove identity "elyadab@hotmail.com" from a particular group. Another recommendation may be to remove identity "Lab-Win2016 VM admin" from the group "a7d6e5e6-1c54." Additionally, a recommendation may be for identity "Labs Resource Admin" to be removed from the group "a7d6e5e6-1c54-42e8." Further, a recommendation may be to remove identity "Oren Lalush" from the group "a7d6e5e6-1c54-42e8-84ed." As with the recommendations in FIG. 3, the recommendations in action window or sub-interface 402 may be selectable to automatically perform the recommended actions, or to confirm whether such actions should be performed. Additionally, as with the display of unused permissions over time in FIG. 3, action window or sub-interface 402 may similarly display unused permissions over time for accounts or virtual instances within Azure™ platform 403.

Figure 5:
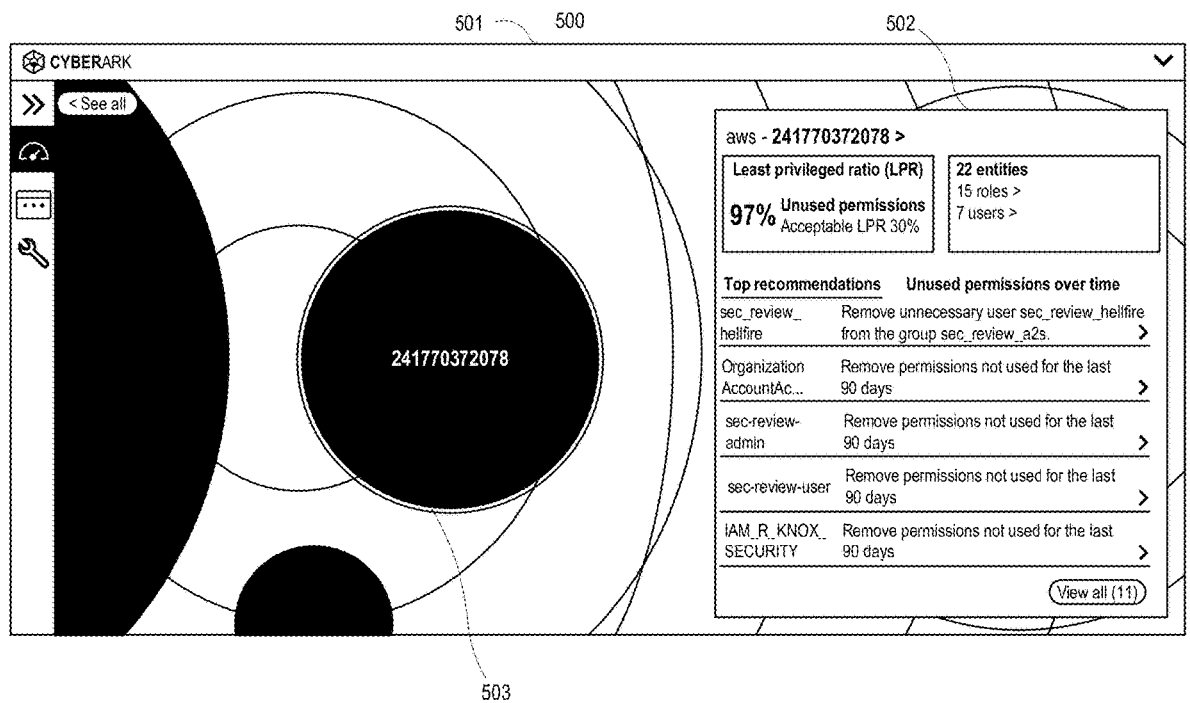
FIG. 5 is an illustration of an exemplary user interface for analyzing detailed risk data regarding a third virtualized network platform in accordance with disclosed embodiments.
Figure 6:
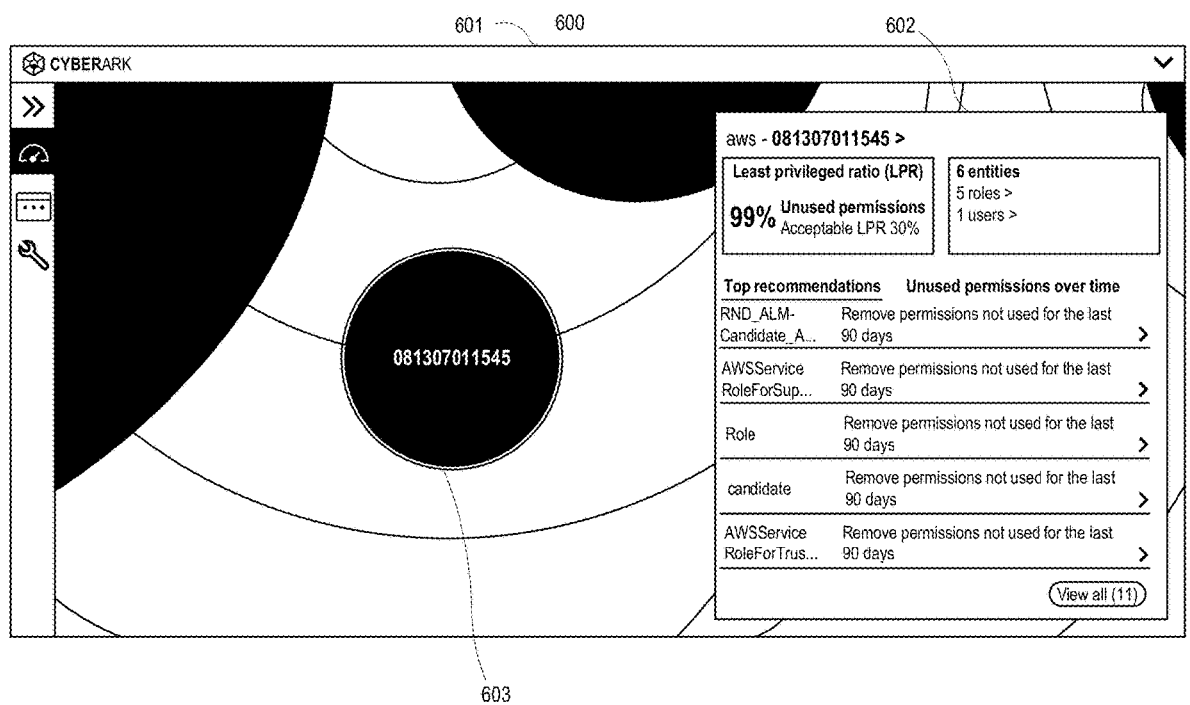
FIG. 6 is an illustration of an exemplary user interface for analyzing detailed risk data regarding a fourth virtualized network platform in accordance with disclosed embodiments.

FIG. 5 illustrates an exemplary user interface 500 for analyzing detailed risk data regarding a third virtualized network platform. Similarly, FIG. 6 illustrates an exemplary user interface 600 for analyzing detailed risk data regarding a fourth virtualized network platform. Consistent with FIG. 2 above, the third virtualized network platform of FIG. 5 may correspond to platform 205, and the fourth virtualized network platform of FIG. 6 may correspond to platform 206. As shown in FIG. 5, the third virtualized network platform 503 may be indicated in interface 500, having a window or sub-interface 501. As with the above discussion, third virtualized network platform 503 may have a size, color, and/or other visual attribute indicating the number of its constituent accounts or virtual instances, and/or its least-privilege score. In interface 600, fourth virtualized network platform 603 may similarly be displayed in interface 600, which may have a window or sub-interface 601. Interface 500 may have an action window or sub-interface 502, and similarly interface 600 may have an action window or sub-interface 602. These action windows may indicate the same types of information as described above in connection with FIGS. 3 and 4, including platform identifiers, data on numbers of constituent accounts of virtual identities, least-privilege scores, least-privilege score thresholds or targets, recommendations for improving the least-privilege scores, and displays of unused permissions over time.

Figure 7:
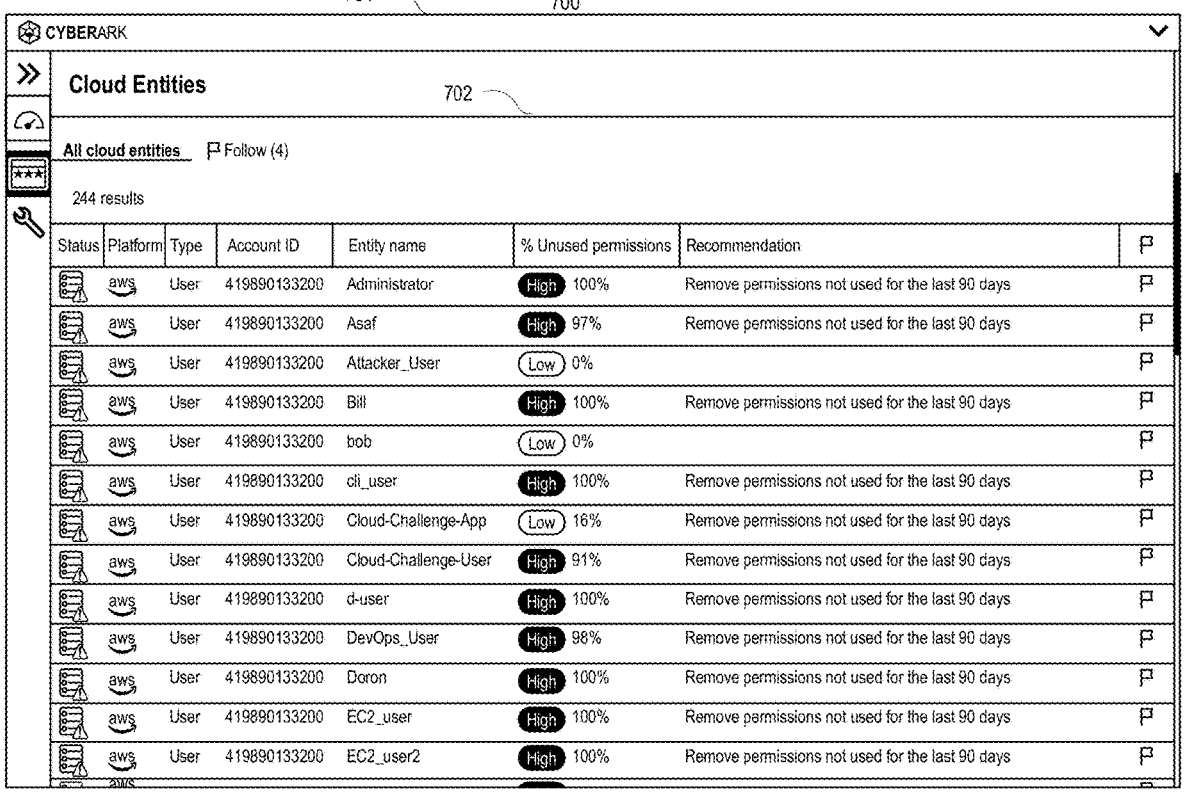
FIG. 7 is an illustration of an exemplary user interface for analyzing risk data for individual virtualized network resources in accordance with disclosed embodiments.

FIG. 7 illustrates an exemplary user interface 700 for analyzing risk data for individual virtualized network resources. With reference to FIG. 3, interface 700 may be displayed in response to selecting the AWS™ platform 303 graphical element, or by selecting another icon in interface 300. As illustrated, interface 700 may provide detailed information regarding individual accounts or virtual instances in AWS™ platform 303. Interface 700 may include a window or sub-interface 701 and a detailed listing interface 702. Consistent with the discussion above, the detailed information displayed in detailed listing interface 702 may come from orchestration tools 104, 108, or from other software monitoring virtual instances 102, 103, 107.

For example, detailed listing interface 702 may provide information regarding a current status of each account or virtual instance. The status may be, for example, instantiated, running, idle, paused or frozen, blocked, deactivated, or spun down. Additionally, detailed listing interface 702 may indicate the type of platform (e.g., AWS™, Azure™ IBM Cloud™ etc.) of each account or instance. The type of account or instance (e.g., user, administrator, root, guest, etc.) may also be displayed, along with a particular account ID or identity ID, and particular account name or identity name. Further, detailed listing interface 702 may display particular least-privilege scores for individual accounts and instances. The scores may be expressed as percentages (e.g., 100%, 97%, 0%, etc.), as rankings (e.g., High, Medium, Low, etc.), or both. Further, detailed listing interface 702 may indicate specific recommendations for individual accounts or virtual instances, which will improve the least-privilege scores. For example, the identity "419890133200" is shown as having a "High" least-privilege score of 100%, and a recommendation for it may be to remove all privileges (or privileged group memberships) not used in the last 90 days. On the other hand, the identity "Attacker_User" may have a "Low" least-privilege score of 0%, and no specific recommendations may be provided for it. Consistent with the above discussion, in some embodiments the recommendations in detailed listing interface 702 may be selectable, in order to perform the recommended actions (or confirm that they should be performed via a prompt). Accordingly, detailed listing interface 702 may also include visual flags, in the right-most column, indicating whether or not particular recommendations have been performed.

Figure 8:
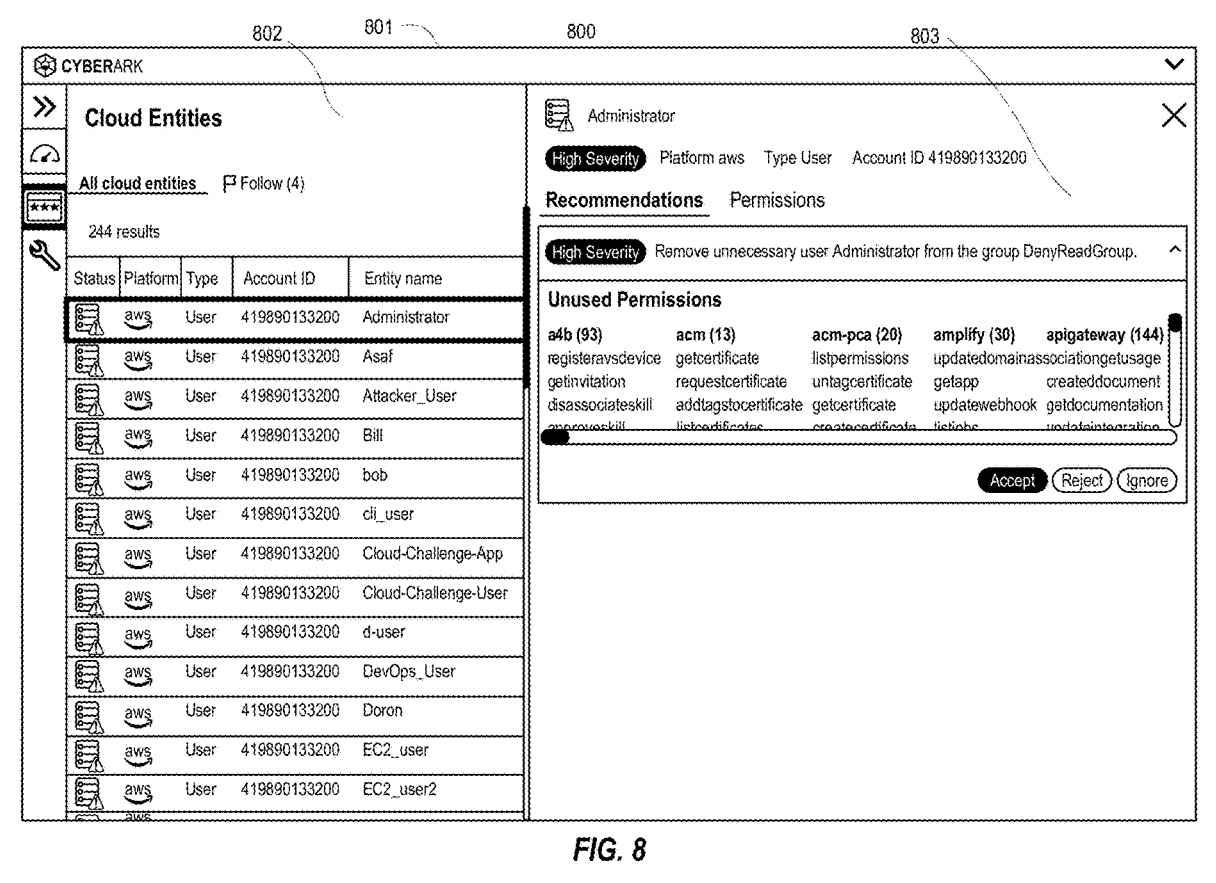

FIG. 8 illustrates an exemplary user interface 800 for identifying recommendations for reducing unused or overly broad privilege risk for a first virtualized network resource. Consistent with above embodiments, interface 800 may include a window or sub-interface 801, which may include a listing interface 802 of particular accounts or virtual instances, and an action window or sub-interface 803. Interface 800 may be generated in response to a selection (e.g., click, touch, or other indication) of a particular identity (e.g., "Administrator" having an account ID "419890133200"). Upon such a selection, detailed information regarding recommendations and unused permissions for this identity may be displayed in action interface 803.

For example, action interface 803 may display individual permissions (e.g., "getcertificate," "getapp," etc.) that the identity has been granted, which have been unused over a defined period of time (e.g., hour, day, month, etc.). Further, action interface 803 may indicate specific recommendations that will address the least-privilege vulnerabilities of the identity. In the example of action interface 803, one recommendation for the identity may be to remove it from the group "DenyReadGroup." As illustrated, action interface 803 may include action icons including "Accept," "Reject," and "Ignore," or the like. Upon selecting "Accept," the recommendation of removing the identity from the group "DenyReadGroup" may be performed. For example, security server 109 (or orchestrator tools 104, 108) may instruct that a particular identity among virtual instances 102, 103, 107 be removed from that privileged access group. Alternatively, security server 109 (or orchestrator tools 104, 108) may prompt privileged access server 105 to remove the identity from that privileged access group. Alternatively, the recommendation may be rejected with selection of "Reject" or ignored (e.g., postponed for a time) with "Ignore."

In some embodiments security server 109 maintains data regarding specific recommendations and selections of the icons (e.g., "Accept," "Reject," "Ignore"). In this manner, security server 109 may track the accuracy of its recommendations, or the probability that they will be accepted via action interface 803. Over time, patterns may be developed for particular recommendations, or for particular identities, that demonstrate a high likelihood of being correct or selected. Through this type of machine learning, action interface 803 may develop likelihoods that its specific recommendations are correct or will be selected. In some embodiments, if the probability that a particular recommendation is correct exceeds a threshold (e.g., 95% probability), that recommendation may be automatically implemented by security server 109. Accordingly, such automatic implementation of recommendations may occur without manual intervention or control.

FIG. 9 illustrates an exemplary user interface 900 for identifying unused or overly broad privileges for a first virtualized network resource. User interface 900 may include a window or sub-interface 901, a listing interface 902 identifying accounts or virtual instances, and an action interface 903. As illustrated, action interface 903 may correspond to action interface 803, as described above. For example, action interface 903 may indicate the various permissions that a particular identity (e.g., "Administrator" user within account "419890133200") has been assigned. In the illustrated example, this particular identity may have various different assigned privileges, whether through privileged group memberships or directly granted privileges (e.g., embedded credentials, credentials rights, etc.). The listing of privileges in action interface 903 may identify the service name of each permission (e.g., "acm"), the name of the permissions themselves (e.g., "getcertificate," "importcertificate," etc.), the activities performed involving the permissions, and the date or time that the permissions were last used. As shown in action interface 903, many of the privileges assigned to "Administrator" user within account "419890133200" are unused over a defined period of time, and thus the "Last used" column is blank.

Figure 10:
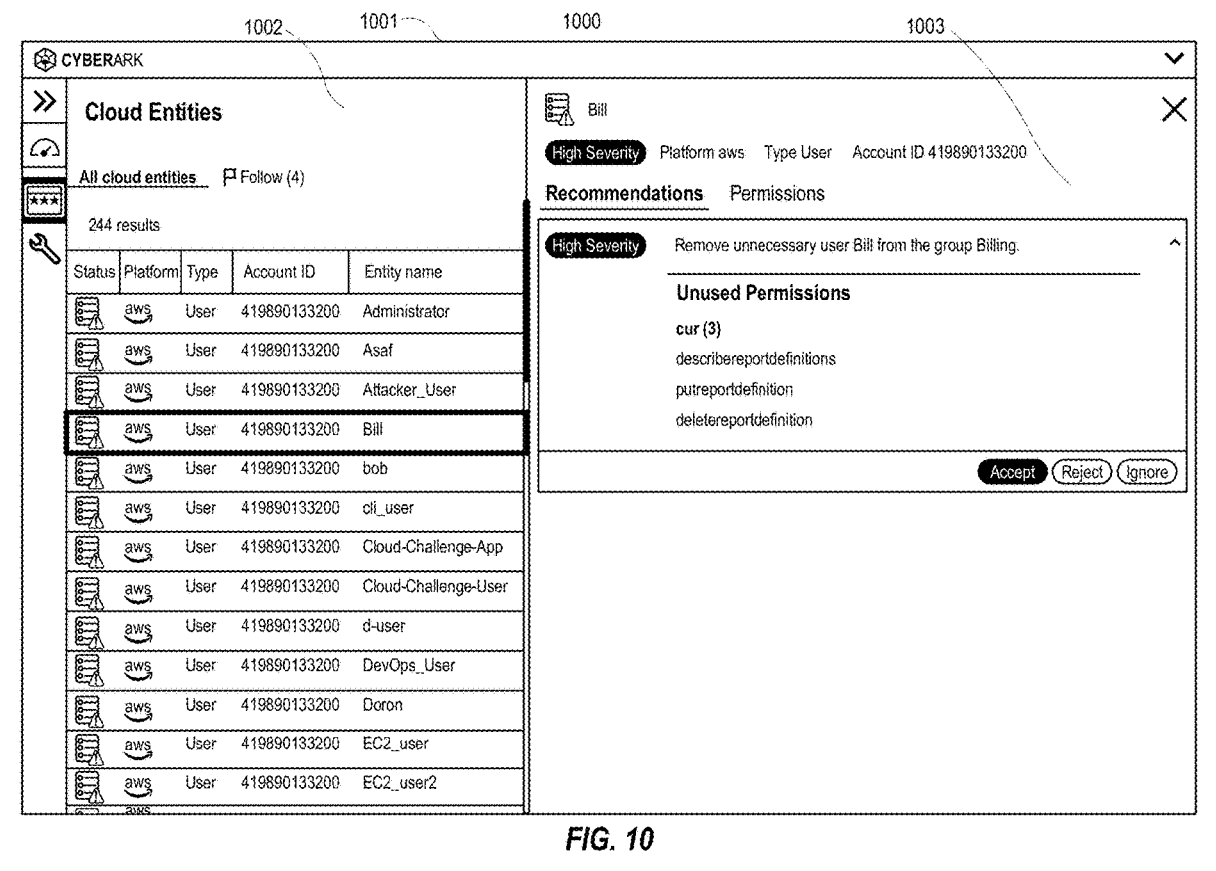
Figure 11:
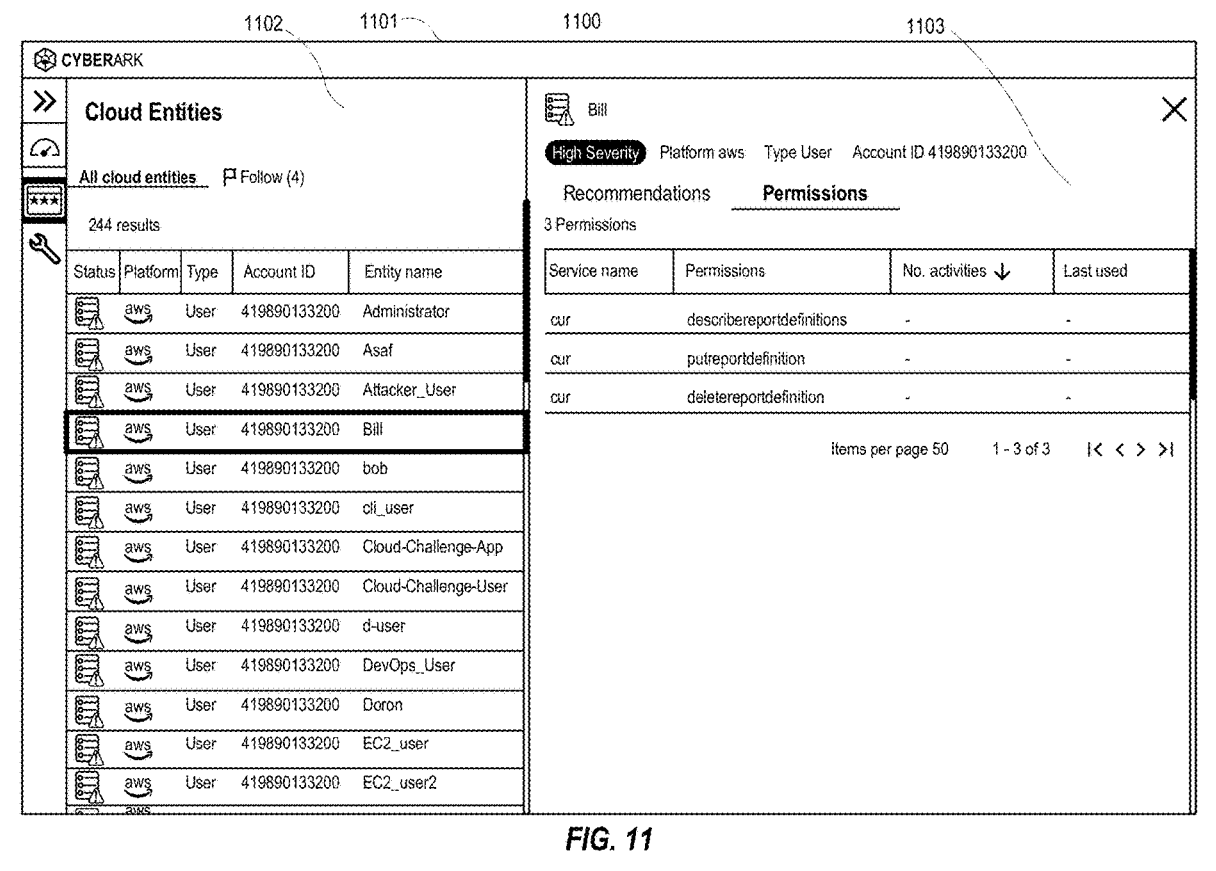

FIGS. 10 and 11 illustrate exemplary user interfaces, 1000 and 1100, respectively, for identifying recommendations for reducing unused or overly broad privilege risk for a second virtualized network resource, and identifying unused or overly broad privileges for a second virtualized network resource. Interfaces 1000 and 1100 are similar, respectively, to interfaces 800 and 900 described above, with regard to a first virtualized network resource. For example, interfaces 800 and 900 may each include a window or sub-interface 1001, 1101, a detailed listing of accounts or virtual instances in listing window 1002, 1102, and an action interface 1003, 1103. While FIGS. 8 and 9 addressed a first identity (e.g., "Administrator" user within account "419890133200"), FIGS. 10 and 11 address a separate identity ("Bill") sharing the same account ("419890133200"). Of course, detailed listing interfaces 1002, 1102 may include identities among one or many different accounts.

In action interface 1003, similar to action interface 803, a particular recommendation is generated for improving the least-privilege score of the identity "Bill." In particular, the recommendation may be to remove "Bill" from the group of "Billing." Further, action interface 1003 may identify particular unused permissions assigned to identity "Bill" (e.g., unused over a defined period of time). As discussed above, interface elements of "Accept," "Reject," and "Ignore" may be presented to allow for the implementation (or not) of the recommended action. Further, consistent with the above embodiments, in some situations a machine learning process may be implemented, where the responses to recommendations (e.g., "Accept" or "Reject") over time are used to develop patterns and probabilities that future recommendations will be correct or accepted. Similar to interface 903, interface 1103 may also include a listing interface 1103 that indicates particular permissions assigned to identity "Bill." As shown, there are only three permissions assigned to "Bill" ("describereportdefinitions," "putreportdefinition," and "deletereportdefinition"), and none have been used within a defined period of time.

Figure 12:
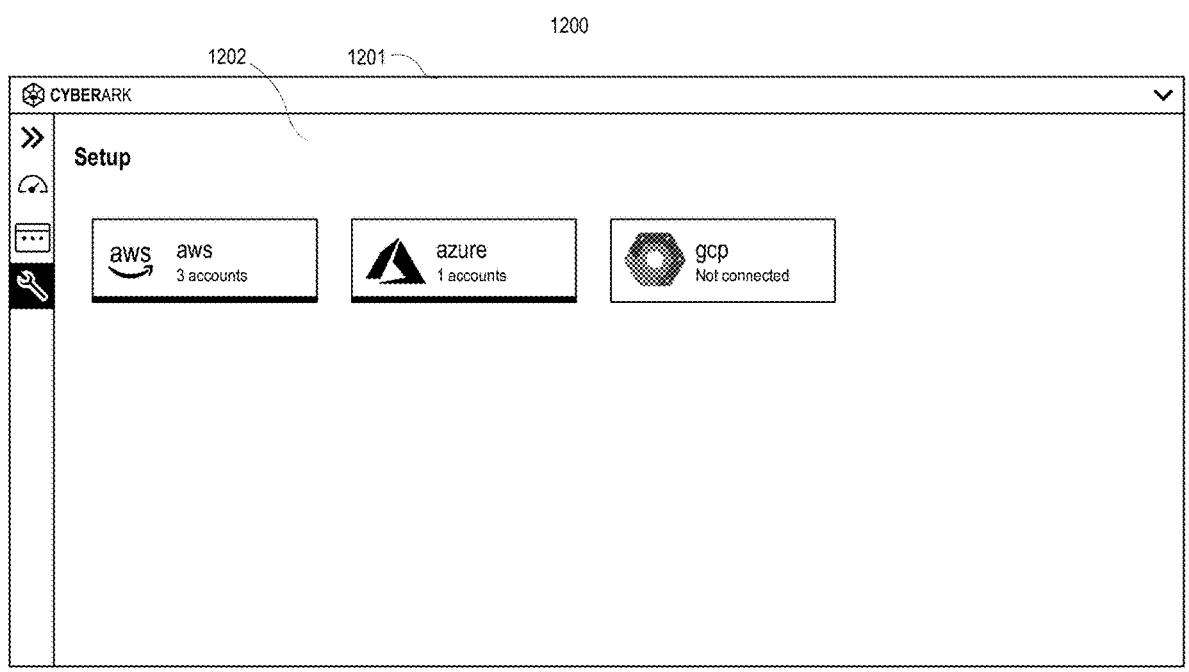
FIG. 12 is an illustration of an exemplary user interface for setting up a plurality of virtualized network platforms for purposes of a risk assessment in accordance with disclosed embodiments.

FIG. 12 illustrates an exemplary user interface 1200 for setting up a plurality of virtualized network platforms for purposes of a privilege risk assessment. In accordance with above embodiments, interface 1200 may include a window or sub-interface 1201, and a setup interface 1202. Within setup interface 1202, graphical elements may be displayed indicating the different virtualized platforms that have been integrated with the risk assessment application. For example, as illustrated, AWS™ Azure™ and Google Cloud Platform™ virtualized environments may have been integrated into the risk assessment application. In some embodiments, the virtualized platforms may be integrated into the risk assessment platform based on data from orchestration tools 104, 108. In accordance with interface 1200, additional virtualized platforms may be added through setup interface 1202, and others may be deleted.

Figure 13:
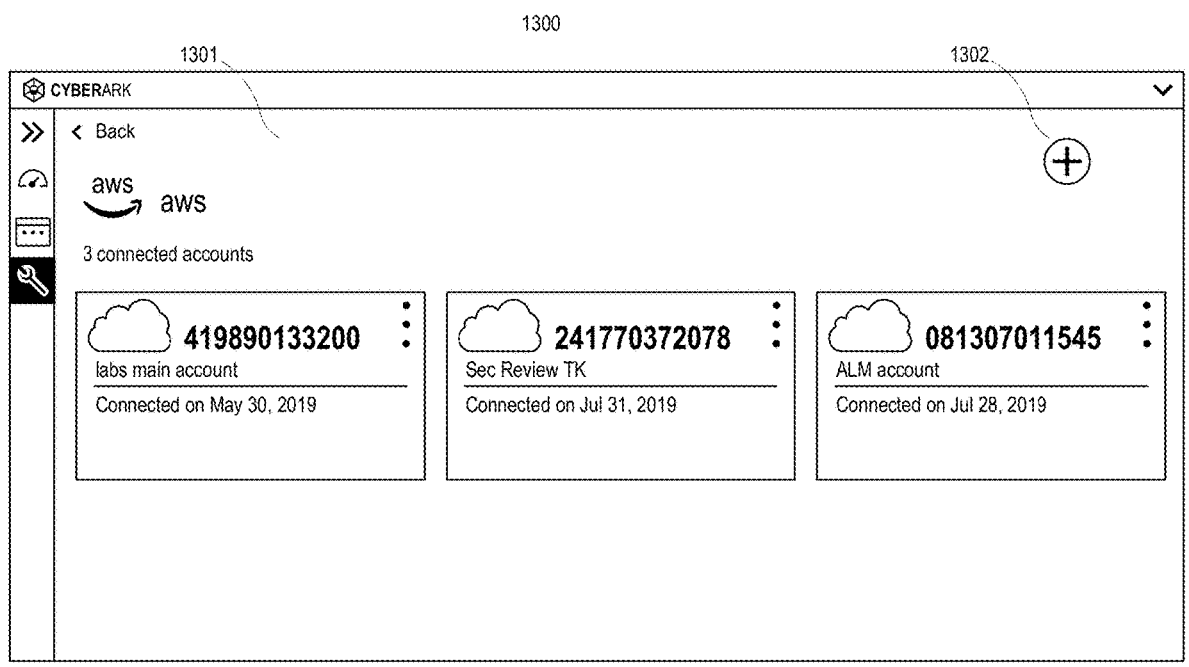
FIG. 13 is an illustration of an exemplary user interface for reviewing virtualized network platforms and their constituent accounts in accordance with disclosed embodiments.
Figure 14:
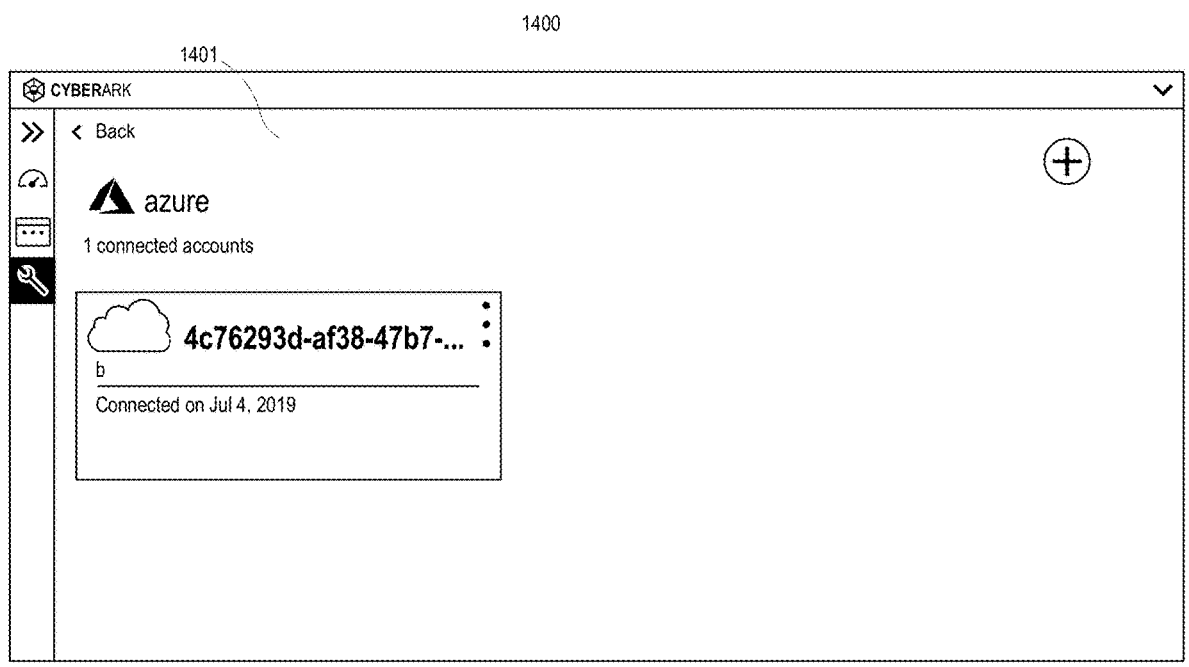
FIG. 14 is an illustration of an exemplary user interface for connecting virtualized network platforms for purposes of a risk data assessment in accordance with disclosed embodiments.

FIG. 13 illustrates an exemplary user interface 1300 for reviewing virtualized network platforms and their constituent accounts. Interface 1300 may include a window or sub-interface 1301, and an add GUI element 1302 for adding additional accounts. Interface 1300 may correspond to interface 1200 in the sense that selecting the AWS™ platform icon within interface 1202 may cause interface 1301 to be generated. As illustrated, interface 1301 may indicate the three different connected accounts that are included in the AWS™ platform. The accounts, as shown, include "labs main account," "Sec Review TK," and "ALM account." Of course, additional or fewer accounts may correspond to each of the virtual computing platforms of FIG. 12. For example, as shown in FIG. 14, interface 1400 includes a single account shown within window or sub-interface 1401, which is an Azure™ account. Consistent with the above embodiments, the risk assessment based on least-privilege scores may be conducted across entire platforms, across discrete accounts, or with respect to individual identities.

Figure 15:
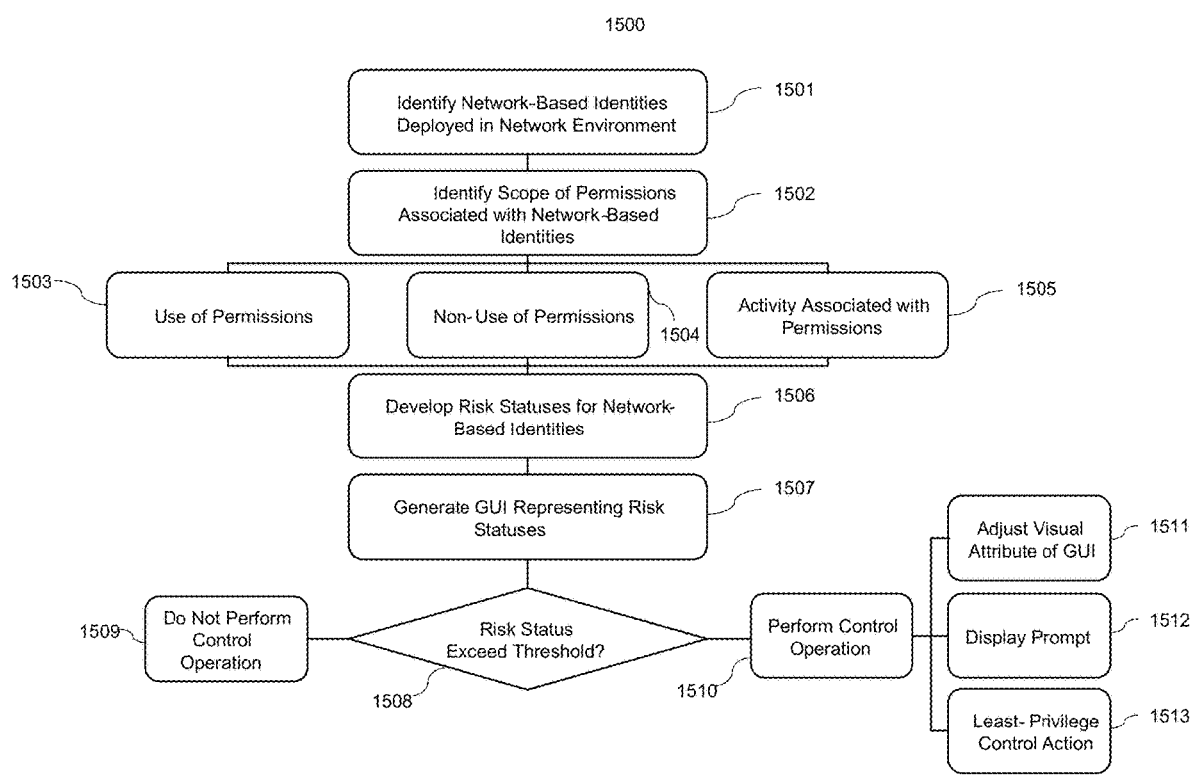
FIG. 15 is an illustration of a flowchart for an exemplary process for analyzing risk data for a plurality of network-based identities and generating interactive graphical user interfaces to allow for visualization of the risk data in accordance with disclosed embodiments.

FIG. 15 illustrates a flowchart for an exemplary process 1500 for analyzing risk data for a plurality of network-based identities and generating interactive graphical user interfaces to allow for visualization of the risk data. In accordance with the discussion above, process 1500 may be performed by security server 109, or by orchestration tools 104, 108. The graphical user interfaces illustrated above in connection with FIGS. 2-14 may be generated by security server 109, or by orchestration tools 104, 108, and may be made available to computing devices for viewing. For example, the interfaces may be made available as web-based documents (e.g., HTML, JavaScript™, Flash™, etc.), through proprietary application interfaces, or through other application rendering formats.

In an operation 1501, process 1500 may include identifying a plurality of network-based identities that have been deployed in a network environment. For example, as discussed above, this may include identifying identities associated with virtual instances 102, 103, 107 in virtualized environments 101, 106. In some cases, orchestration tools 104, 108 may be configured to automatically report this information upon instances 102, 103, 107 being spun up, deployed into operation, being assigned privileges, requesting privileges (e.g., from privileged access server 105), or being deactivated. The identities that are identified may comprise, for example, the identities that underly the platforms 203, 204, 205, 206 as depicted in FIG. 2.

Operation 1502 may include identifying a scope of permissions associated with the plurality of network-based identities. Consistent with the above discussion, in some cases this may involve querying a privilege management resource, such as privileged access server 105, to determine the current level of permissions of the identities. The permissions may be expressed, for example, as group memberships or as listings of specific privileges associated with individual identities. Further, as discussed above, in some embodiments the scope of permissions for the identities may be gathered from privilege management tools, whether integrated into orchestration tools 104, 108 or separate. Examples of such privilege management tools may include AWS Identity and Access Management (IAM)™, Azure Active Directory (AD) Privileged Identity Management (PIM)™, IBM Privileged Access Management™, and others. Based on the identifying of the scope of privileges for the identities, in some embodiments security server 109 may update or generate a database for the identities. As discussed above, the database may identify the identities, and their particular permissions at certain dates and times. The database may thus be used to provide both a current view of the identities' privileges, and also a historical view of the privileges.

In operations 1503, 1504, and 1505, process 1500 may include determining a scope of at least one of: use of the permissions, non-use of the permissions, or activity associated with the permissions for the plurality of network-based identities. That is, in some embodiments only one of operations 1503, 1504, and 1505 are performed, while in other embodiments two or more are performed. The actual use of permissions may be determined in operation 1503. As discussed above, this may involve monitoring or intercepting the communications activity of individual identities among virtual instances 102, 103, 107, and determining whether they have asserted particular permissions. Conversely, operation 1504 may identify the non-use of particular permissions by individual identities. Activity associated with permissions may be tracked in operation 1505. Consistent with the discussion above, this activity may include requests for privileges, attempts to access network resources for which privileged access requirements exist, requests to update or refresh privileges, or various other activities. Each of the types of data gathered in operations 1503, 1504, and

1505, as applicable, may be stored in a database maintained by security server 109. Accordingly, the data may be available for current and historical access.

In operation 1506, process 1500 may include developing, based on at least the identified scope of permissions and the determined scope of activity, risk statuses for the plurality of network-based identities. As described above, risk statuses or least-privilege levels may be computed and displayed in a variety of ways. For example, least-privilege levels may be a percentage or fraction of privileges granted to an identity that are unused over a defined period of time (e.g., one day, one week, one month, etc.). If the fraction is high (e.g., 90%), that may indicate that many of the privileges assigned to an identity are unused, which can be a security vulnerability. Conversely, if few privileges are unused (e.g., 5%), that may be a positive sign that the identity has an appropriate level of privileges to carry out its legitimate tasks, and no substantial excess privileges. Further, levels of unused privileges may be expressed as categories (e.g., high, medium, low), through a ranking (e.g., scale of 1 to 5), or through other numerical or qualitative expressions. Examples of using colors, shading, gradients, three-dimensional graphics, movements, animations, and other visual classification tools are described above and further discussed below. Consistent with above embodiments, the risk statuses for the identities being analyzed may be determined across an entire environment, across a particular virtual computing platform, across an account, or specifically with respect to an individual identity.

Operation 1507 may include generating a graphical user interface representing the risk statuses. The graphical user interface may include a first graphical element having a size and a color, the size and the color being determined based on the risk statuses associated with a first platform within the network environment. For example, as discussed above in connection with FIG. 2, AWS™ platform 203 has a larger circle than Azure™ platform 204, since AWS™ platform 203 has more constituent virtual instances. The relative size of the visual elements in FIG. 2 may thus convey the relative number of identities in each platform. Alternatively, different shapes (e.g., triangles, rectangles, etc.) may potentially be used to convey different magnitudes of constituent identities. In addition to shapes and sizes of shapes, colors may be used in the graphical user interface to connote levels of least-privilege risk. For example, for platforms (or accounts, or identities) having least-privilege levels above a configurable threshold level (e.g., 30%), they may be colored red, or progressively darker shades of red based on their least-privilege level. Conversely, platforms (or accounts, or identities) having least-privilege levels below the configurable threshold may be colored green, white, etc. As further variations on color, other graphical indications of least-privilege level may be used to differentiate platforms (or accounts, or identities), such as shading, opacity, texture, color patterns, three-dimensional depth, and more. Further, in some embodiments motion or animation may be added to the visual elements in the interface to differentiate their respective least-privilege levels. For example, for a particularly high least-privilege score, a particular platform may have a visual element that appears to vibrate, shake, throb, electrify, or blink, among other possible motions or animations.

In accordance with operation 1507, the graphical user interface may also include a second graphical element having a size and a color, where the size and the color are determined based on the risk statuses of network-based identities within the first platform. For example, this second graphical element may represent a virtual computing platform different from the first platform (e.g., an AWS™ and an Azure™ platform). Alternatively, in some embodiments the second graphical element may be a drill-down element representing a more detailed view of the first graphical element. For example, with reference to FIGS. 2 and 3, the first graphical element may be AWS™ platform 203 and the second graphical element may be AWS™ platform 303. Further, as another variation, the first graphical element may be AWS™ platform 303 of FIG. 3, and the second graphical element may be one or more entries in interface 702 of FIG. 7, representing detailed identity data corresponding to AWS™ platform 303.

According to some embodiments, at least one of the first or second graphical elements may be selectable by a user (e.g., via clicking, touching, or otherwise indicating), and upon selection the graphical user interface may be configured to perform one or more responsive operations. For example, with reference to FIG. 2, AWS™ platform 203 may be selected, or with reference to FIG. 3, AWS™ platform 303 may be selected. In response to such a selection, the graphical user interface may display risk status information indicative of one or more of the plurality of network-based identities. For example, with reference to FIG. 3, action interface 302 may be displayed, with reference to FIG. 7, interface 702 may be displayed, or with reference to FIG. 8, action interface 803 may be displayed. In addition, in some embodiments selection of a platform, account, or identity may cause a display in the interface of remedial action information indicating one or more actions to take in the network environment to adjust the risk status information for the one or more of the plurality of network-based identities. As examples, the recommendations for actions of FIG. 7, FIG. 8, and FIG. 10 may be displayed. Consistent with the above embodiments, in some situations the recommendations may be selectable in order to affirmatively perform the recommended actions. Alternatively, selecting the recommendations may cause generation of a prompt, confirming whether the recommended actions should be performed. In still further embodiments, as discussed above, some of the recommended actions may be performed automatically. For example, in embodiments using machine-learning to develop probabilities that certain recommended actions are correct or will be selected, if the probability of a recommended action is above a threshold (e.g., above 90% probability), it may automatically be implemented. Alternatively, the probability may be expressed to the user. For example, a recommendation with a probability over 90% may be displayed as a "strong" recommendation, a recommendation with a probability of between 50%-89% may be deemed a "suggested" recommendation, and a recommendation with a probability under 50% may be deemed an "optional" recommendation. Of course, other threshold probabilities and classifications are possible as well.

In accordance with process 1500, operation 1508 may include determining whether the developed risk statuses (e.g., from operation 1506) for the plurality of network-based identities are determined to exceed the configurable threshold of risk status. For example, with reference to FIG. 2, both the AWS™ and Azure™ platforms have least-privilege scores (98% and 99%, respectively) that exceed the configurable 30% threshold level. In that case, operation 1508 may result in performing a control action in operation 1510. The control action in operation 1510 may take several forms. For example, in operation 1511, the control action may include adjusting a visual attribute of the graphical user interface. This may include, for example, selecting a particular color (e.g., red), gradient, texture, three-dimensional depth, movement, animation, or other visual attribute that indicates the exceeding of the configurable threshold. Alternatively, or in addition, operation 1512 may include generating a prompt when the configurable threshold is exceeded. For example, the prompt may indicate the particular platform that exceeded the configurable threshold, the least-privilege score of the platform, the threshold level, the number of accounts or identities in the platform, and other data as well. As another option, operation 1513 may include performing a least-privilege control action for the platform or its constituent identities. For example, the least-privilege control action may include reducing the assigned privileges for the platform (or identities) to a least-privilege level. This could be, for example, a level based on actual privileges used by the identity over a period of time. Alternatively, this could be a default or assigned least-privilege level, based on a security policy or a reference to other identities deemed similar to the affected identities. Further, in some embodiments operation 1513 may include revoking or rotating privileges associated with the platform or constituent identities. Various other control actions are possible as well.

Further, in some embodiments the control operations in operation 1510 may be implemented on a group level. For example, if a set of recommendations is identical across a set of identities within an account (e.g., in the circumstance illustrated in FIG. 7), a common control action may be implemented for the entire set of identities. In the case of FIG. 7, for all of the identities having a recommendation of "Remove permissions not used for the last 90 days," that common control action may be implemented for all such identities collectively. Similarly, in some cases recommended control actions may be performed across an entire platform (e.g., for all identities having the same recommended control action, or for all identities having a least-privilege score above the threshold, etc.), or across an entire environment.

Alternatively, if operation 1508 determines that a platform, account, or identity does not have a least-privilege profile exceeding the configurable threshold, process 1500 may continue to operation 1509, where no control action is performed. In that event, process 1500 may repeat, periodically or continuously, until a different result is reached in operation 1508.

In some embodiments, different environments, platforms, accounts, or identities may have different least-privilege threshold levels. For example, some identities may be associated with highly sensitive and deterministic devices, such as power plant reactors, surveillance devices, hydraulic pumps, etc. For these types of sensitive and deterministic devices, it may make sense to have a relatively strict least-privilege threshold (e.g., 5%, or even 1%). By contrast, for platforms that are more dynamically changing, or that are less sensitive, it may suffice to have a less stringent least-privilege threshold (e.g., 20% or 40%). The threshold levels may be developed through the machine-learning techniques discussed above, in some embodiments, in order to ensure that environments have threshold levels that provide an adequate balance between security and flexibility.

It is to be understood that the disclosed embodiments are not necessarily limited in their application to the details of construction and the arrangement of the components and/or methods set forth in the following description and/or illustrated in the drawings and/or the examples. The disclosed embodiments are capable of variations, or of being practiced or carried out in various ways.

The disclosed embodiments may be implemented in a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowcharts or block diagrams may represent a software program, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant virtualization platforms, virtualization platform environments, trusted cloud platform resources, cloud-based assets, protocols, communication networks, security tokens and authentication credentials will be developed and the scope of these terms is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A non-transitory computer readable medium including instructions that, when executed by at least one processor, cause the at least one processor to perform operations for analyzing risk data for a plurality of network-based identities and generating interactive graphical user interfaces to allow for visualization of the risk data, the operations comprising:
    identifying a plurality of network-based identities that have been deployed in a virtual computing environment;
    identifying a scope of permissions associated with the plurality of network-based identities;
    determining a scope of activity of at least one of: use of the permissions, non-use of the permissions, or activity associated with the permissions for the plurality of network-based identities;
    developing, based on at least the identified scope of permissions and the determined scope of activity, risk statuses for the plurality of network-based identities; and
    generating a graphical user interface representing the risk statuses, the graphical user interface comprising a first graphical element having a size and a color, the size and the color being determined based on the risk statuses associated with a first platform within the virtual computing environment;
    wherein the graphical user interface further comprises a second graphical element having a size and a color, the size and the color being determined based on the risk statuses of network-based identities within the first platform;
    wherein at least one of the first or second graphical elements are selectable, and upon selection the graphical user interface is configured to display at least:

risk status information indicative of one or more of the plurality of network-based identities, and remedial action information indicating one or more actions to take in the virtual computing environment to adjust the risk status information for the one or more of the plurality of network-based identities, the one or more actions including a least-privilege control action for at least a portion of the plurality of network-based identities.

2. The non-transitory computer readable medium of claim 1, wherein the graphical user interface identifies a configurable threshold risk status for the plurality of network-based identities.

3. The non-transitory computer readable medium of claim 2, wherein if the developed risk statuses for the plurality of network-based identities are determined to exceed the configurable threshold, the operations further comprise performing at least one of:

adjusting a visual attribute of the first or second graphical elements, or displaying a prompt in the graphical user interface.

4. The non-transitory computer readable medium of claim 1, wherein determining the scope of activity associated with the permissions includes identifying a scope of actual activity and a scope of permitted activity.

5. The non-transitory computer readable medium of claim 4, wherein the operations further comprise identifying, based on the scope of permitted activity, one or more of the plurality of network-based identities having administrator privileges.

6. The non-transitory computer readable medium of claim 1, wherein the remedial action information includes a removal of privileges not used by the one or more of the plurality of network-based identities over a threshold period of time.

7. The non-transitory computer readable medium of claim 1, wherein the remedial action information is displayed in conjunction with a selectable element, and upon selection of the selectable element the remedial action is performed in the virtual computing environment.

8. The non-transitory computer readable medium of claim 1, wherein the operations further comprise developing platform-level risk statuses for the first network platform and a second network platform.

9. The non-transitory computer readable medium of claim 1, wherein the operations further comprise developing an environment-level risk status for the virtual computing environment.

10. A computer-implemented method for analyzing risk data for a plurality of network-based identities and generating interactive graphical user interfaces to allow for visualization of the risk data, the method comprising:

identifying a plurality of network-based identities that have been deployed in a virtual computing environment;

identifying a scope of permissions associated with the plurality of network-based identities;

determining a scope of activity of at least one of: use of the permissions, non-use of the permissions, or activity associated with the permissions for the plurality of network-based identities;

developing, based on at least the identified scope of permissions and the determined scope of activity, risk statuses for the plurality of network-based identities; and generating a graphical user interface representing the risk statuses, the graphical user interface comprising a first graphical element having a size and a color, the size and the color being determined based on the risk statuses associated with a first platform within the virtual computing environment;

wherein the graphical user interface further comprises a second graphical element having a size and a color, the size and the color being determined based on the risk statuses of network-based identities within the first platform;

wherein at least one of the first or second graphical elements are selectable, and upon selection the graphical user interface is configured to display at least:

risk status information indicative of one or more of the plurality of network-based identities, and remedial action information indicating one or more actions to take in the virtual computing environment to adjust the risk status information for the one or more of the plurality of network-based identities, the one or more actions including a least-privilege control action for at least a portion of the plurality of network-based identities.

11. The computer-implemented method of claim 10, further comprising maintaining a plurality of permission threshold levels for the plurality of network-based identities.

12. The computer-implemented method of claim 11, wherein at least one of the size or the color of the first graphical element is determined based on the plurality of permission threshold levels.

13. The computer-implemented method of claim 10, wherein the remedial action information is unique as to a particular one of the plurality of network-based identities.

14. The computer-implemented method of claim 10, wherein the remedial action information is unique as to a group of the plurality of network-based identities.

15. The computer-implemented method of claim 10, further comprising identifying new network-based identities added to the virtual computing environment, and automatically developing risk statuses for the new network-based identities.

16. The computer-implemented method of claim 10, wherein the remedial action information is displayed in conjunction with a selectable element, and upon selection the remedial action is performed in the virtual computing environment.

17. The computer-implemented method of claim 10, wherein the first graphical element is associated with a particular virtual computing orchestration platform.

18. The computer-implemented method of claim 10, further comprising developing platform-level risk statuses for the first network platform and a second network platform.

19. The non-transitory computer readable medium of claim 2, wherein the remedial action information is based on a determination that the developed risk statuses for the plurality of network-based identities exceed the configurable threshold.

20. The computer-implemented method of claim 11, wherein the remedial action information is based on a determination that the developed risk statuses for the plurality of network-based identities exceed one or more of the plurality of permission threshold levels.

* * * * *